(12) United States Patent
Kobori et al.

(10) Patent No.: US 12,472,919 B2
(45) Date of Patent: Nov. 18, 2025

(54) CHECK VALVE AND BRAKE SYSTEM

(71) Applicant: HITACHI ASTEMO UEDA, LTD., Ueda (JP)

(72) Inventors: Tetsuo Kobori, Ueda (JP); Motoyasu Nakamura, Ueda (JP); Yoshiteru Matsunaga, Ueda (JP)

(73) Assignee: Hitachi Astemo Ueda, Ltd., Nagano (JP)

( * ) Notice: Subject to any disclaimer, the term of this patent is extended or adjusted under 35 U.S.C. 154(b) by 491 days.

(21) Appl. No.: 17/920,249

(22) PCT Filed: Apr. 20, 2021

(86) PCT No.: PCT/JP2021/016051
§ 371 (c)(1),
(2) Date: Oct. 20, 2022

(87) PCT Pub. No.: WO2021/220888
PCT Pub. Date: Nov. 4, 2021

(65) Prior Publication Data
US 2023/0303049 A1   Sep. 28, 2023

(30) Foreign Application Priority Data

Apr. 30, 2020 (JP) ................................ 2020-080663
Apr. 30, 2020 (JP) ................................ 2020-080664
(Continued)

(51) Int. Cl.
*B60T 15/36* (2006.01)
*B60T 13/14* (2006.01)
(Continued)

(52) U.S. Cl.
CPC ............ *B60T 15/36* (2013.01); *B60T 13/148* (2013.01); *F15B 13/027* (2013.01); *F16K 15/063* (2013.01)

(58) Field of Classification Search
CPC .... B60T 13/745; F16K 15/063; F15B 13/027; F15B 7/08
See application file for complete search history.

(56) References Cited

U.S. PATENT DOCUMENTS 4,257,443 A * 3/1981 Turney .................. F16K 15/063
    137/454.2
4,305,425 A * 12/1981 Mackal ................. F16K 15/063
    137/543.17
(Continued)

FOREIGN PATENT DOCUMENTS

CA    2236767 A1 *  8/1999 ........... F16K 15/063
JP    S59-79672 U    5/1984
(Continued)

OTHER PUBLICATIONS

The extended European search report dated Apr. 26, 2024 issued in the corresponding EP Patent Application No. 1 21796734.8.
(Continued)

*Primary Examiner* — Bradley T King
(74) *Attorney, Agent, or Firm* — Carrier, Shende & Associates P.C.; Joseph P. Carrier; Fulchand P. Shende

(57) ABSTRACT

A check valve is arranged in a flow path through which hydraulic fluid flows. The check valve includes: a cap fixed in the flow path; a plug seated on a seat surface provided in the flow path; a first extension provided in the cap and extending from the cap toward the plug; a second extension provided in the plug, extending from the plug toward the cap, and guided by the first extension; and a spring interposed between the cap and the plug to bias the plug toward the seat surface. The check valve further includes a retainer attached to the cap, extending from the cap toward the plug, and locked to the second extension.

19 Claims, 12 Drawing Sheets

(30) Foreign Application Priority Data

Apr. 30, 2020 (JP) ................................ 2020-080665
Apr. 30, 2020 (JP) ................................ 2020-080666

(51) Int. Cl.

*F15B 13/02* (2006.01)
*F16K 15/06* (2006.01)

(56) References Cited

U.S. PATENT DOCUMENTS

| | | | | |
|---|---|---|---|---|
| 4,750,516 A * | 6/1988 | Heffner | ................... | F16K 47/02 |
| | | | | 137/526 |
| 5,353,834 A | 10/1994 | Schmitt et al. | | |
| 5,653,256 A * | 8/1997 | Myers | ................... | F16K 15/063 |
| | | | | 137/454.2 |
| 10,239,511 B2 | 3/2019 | Matsunaga | | |
| 11,512,789 B2 * | 11/2022 | Byun | ................... | F16K 11/105 |
| 2001/0025629 A1 | 10/2001 | Kiowsky et al. | | |
| 2006/0054848 A1 * | 3/2006 | Vogt | ................... | F16K 15/063 |
| | | | | 251/77 |
| 2006/0137747 A1 | 6/2006 | Duex | | |
| 2006/0196556 A1 * | 9/2006 | Johnson | ................ | F16K 15/063 |
| | | | | 137/542 |
| 2007/0193633 A1 * | 8/2007 | Howell | ................. | F16K 15/063 |
| | | | | 137/542 |
| 2008/0173015 A1 * | 7/2008 | Ogiwara | ................. | B60T 11/22 |
| | | | | 137/511 |
| 2017/0159834 A1 * | 6/2017 | Jeon | ........................ | F16K 1/46 |
| 2017/0282879 A1 * | 10/2017 | Matsunaga | ........... | B60T 11/165 |
| 2018/0335154 A1 * | 11/2018 | Jeon | ........................ | B60T 15/36 |
| 2021/0215264 A1 * | 7/2021 | Fletcher | .............. | F16K 27/0209 |
| 2021/0231224 A1 * | 7/2021 | Sugino | .................. | F16K 15/026 |
| 2022/0260166 A1 * | 8/2022 | Bottom | .................. | F16K 35/10 |
| 2022/0412489 A1 * | 12/2022 | Vega | .................... | F16L 23/028 |
| 2024/0110631 A1 * | 4/2024 | Moon | ................. | F16K 31/1245 |
| 2024/0288083 A1 * | 8/2024 | Kwak | ................... | B60T 13/686 |
| 2024/0318736 A1 * | 9/2024 | Feng | ....................... | F16K 27/02 |

FOREIGN PATENT DOCUMENTS

| | | |
|---|---|---|
| JP | H06-35749 U | 5/1994 |
| JP | H06-35750 U | 5/1994 |
| JP | H06-201060 A | 7/1994 |
| JP | 2001-304060 A | 10/2001 |
| JP | 2013-019442 A | 1/2013 |
| JP | 2016-044787 A | 4/2016 |
| JP | 2017-178099 A | 10/2017 |

OTHER PUBLICATIONS

Office Action dispatched from the JPO on May 7, 2024, issued in the corresponding JP Patent Application No. 2020-080666 with the English machine translation thereof.

\* cited by examiner

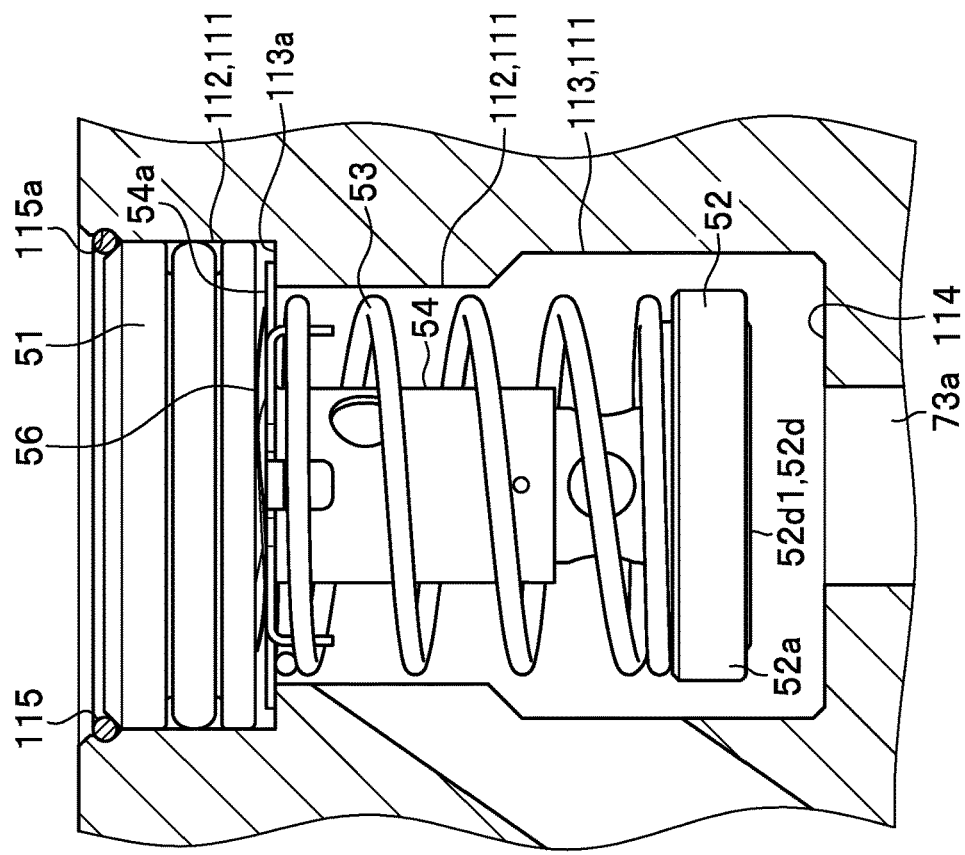
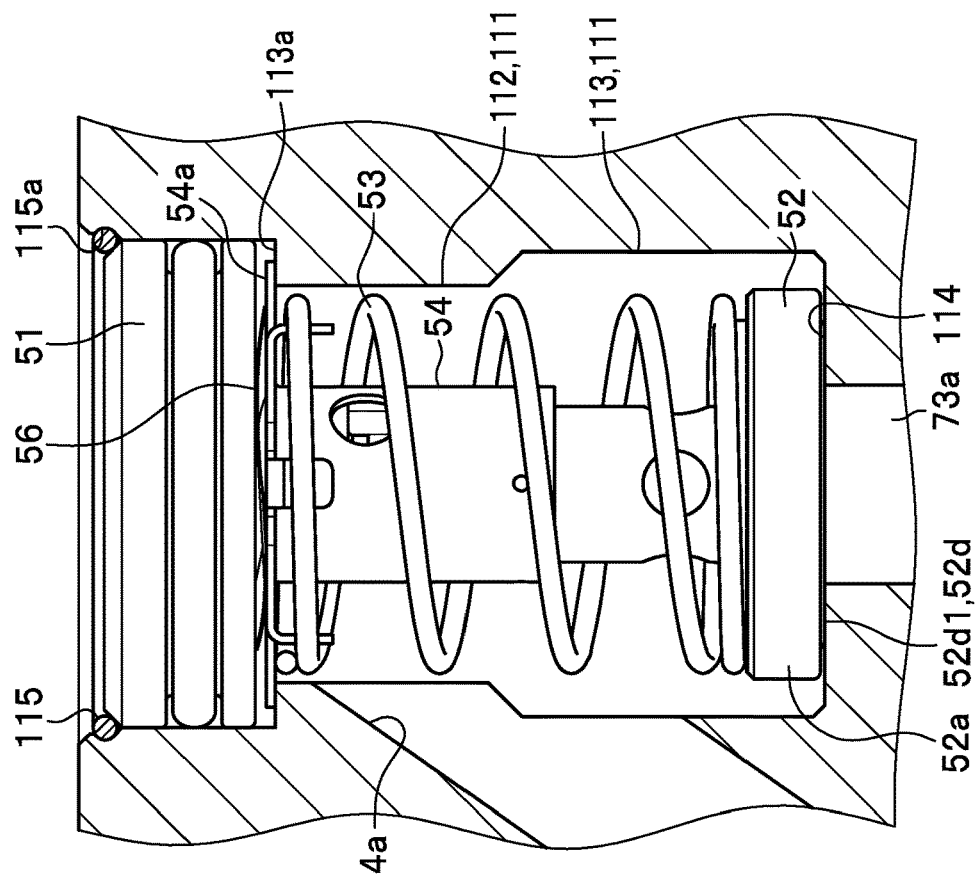

CHECK VALVE AND BRAKE SYSTEM

CROSS-REFERENCE TO RELATED APPLICATION

This application is a U.S. National Stage Application under 35 U.S.C § 371 of International Patent Application No. PCT/JP2021/016051 filed on 20 Apr. 2021, which claims the benefit of priority to Japanese Patent Application No. 2020-080663 filed on 30 Apr. 2020, Japanese Patent Application No. 2020-080664 filed on 30 Apr. 2020, Japanese Patent Application No. 2020-080665 filed on 30 Apr. 2020, and Japanese Patent Application No. 2020-080666 filed on 30 Apr. 2020, the disclosures of all of which are hereby incorporated by reference in their entireties.

TECHNICAL FIELD

The present invention relates to a check valve and a brake system.

BACKGROUND OF THE INVENTION

Patent Document 1 discloses a well-known conventional brake system with a check valve. The brake system in Patent Document 1 aspirates brake fluid from the reservoir tank into the slave cylinder via the supply path. The check valve is provided in the supply path to prevent brake fluid pressure generated in the slave cylinder from being transmitted toward the reservoir tank.

The check valve includes the cap fixed to the base body of the slave cylinder, the plug for opening and closing the flow path, and the spring interposed between the cap and the plug.

BACKGROUND ART

Japanese Patent Application Publication No. 2017-178099 (hereinbelow, referred to as Patent Document 1).

SUMMARY OF THE INVENTION

Problems to be Solved

The check valve in Patent Document 1 is assembled in the base body by inserting the cap, the plug, and the spring separately into the base body. For this reason, there is a risk of manufacturing costs increasing, due to additional assembly steps, and grit and dust entering the assembly during the assembly steps.

The present invention is intended to provide a check valve and a brake system to reduce manufacturing costs and suitably prevent grit and dust from entering therein.

Solution to Problems

A check valve of the present invention, which has been devised to solve such a problem, is one arranged in a flow path through which hydraulic fluid flows. The check valve includes a cap fixed in the flow path and a plug seated on a seat surface provided in the flow path. The cap includes a first extension extending toward the plug. The plug includes a second extension extending toward the cap and guided by the first extension. A spring is interposed between the cap and the plug to bias the plug toward the seat surface. The cap is attached with a retainer extending from the cap toward the plug and locked to the second extension.

According to this check valve, the cap, plug, and spring are combined by the agency of the retainer, as a combined product. Therefore, there is no need to assemble the cap, the plug, and the spring in the base body, as in conventional cases. This reduces manufacturing costs and suitably prevents grit and dust from entering the assembly.

In addition, the check valve being assembled as a combined product allows for suitably preventing the plug and/or spring from falling, to have less chance of the product being assembled with these failures. The check valve being a combined product also facilitates part replacement of the check valve.

It is preferable that the retainer is provided with a first protrusion to be locked to the second extension, and the second extension is provided with a locking portion to which the first protrusion is locked. This configuration allows the retainer to be locked to the second extension with a simple structure of a first protrusion and a locking portion to which the first protrusion is locked. Accordingly, combining is easy.

In addition, it is preferable that the retainer is provided with a disk-shaped base to face one end of the spring, and the base is formed with a protrusion to position said one end of the spring. This configuration allows one end of the spring to be positioned on the base, to have less chance of the spring being displaced and thus less chance of the plug having an unbalanced load when slid with respect to the cap. Accordingly, sliding resistance is reduced and surface pressure of the spring is equalized with respect to the plug, to improve seating performance of the plug.

Further, it is preferable that the first extension is formed with a groove, and the retainer is provided with a second protrusion to engage with the groove. This configuration allows the retainer to be attached to the first extension with a simple structure of the groove provided in the first extension and the second protrusion provided in the retainer to engage with the groove. Accordingly, combining is easy.

Still further, it is preferable that the first extension has a cylindrical shape, the second extension has a cylindrical shape to be slidably mounted onto an outer surface of the first extension, and the retainer has a cylindrical wall to be arranged on a radially outer side of the second extension. In this case, assuming that a clearance between the outer surface of the first extension and an inner surface of the second extension is CL1, and a clearance between an outer surface of the second extension and an inner surface of the cylindrical wall is CL2, it is preferable that there is a relationship of CL1 being smaller than CL2 (CL1<CL2).

This configuration allows for securing a clearance of the inner surface of the cylindrical wall of the retainer not contacting the outer surface of the second extension, when the second extension of the plug is slid with respect to the first extension of the cap. Accordingly, sliding resistance is reduced to improve response of opening/closing the flow path by the plug.

Still further, it is preferable that the second extension and the cylindrical wall are each formed with a flow-through portion to allow hydraulic fluid to flow therethrough. This configuration allows hydraulic fluid to flow through the flow-through portions, to prevent sliding lock due to fluid tightness.

Still further, it is preferable that the first extension and the second extension are in sliding contact with each other, with a sliding allowance extending in an axial direction thereof. This configuration allows for implementing smooth sliding between the first extension and the second extension. Additionally, an increased sliding amount also increases the sliding allowance, to effect a stable stroke of the plug with respect to the cap.

Still further, it is preferable that the check valve is arranged in an accommodation chamber having a first accommodation chamber and a second accommodation chamber connected to the first accommodation chamber, and includes a cap fixed to the first accommodation chamber and a plug seated on a seat surface provided in the second accommodation chamber. In this case, it is preferable that the cap includes a first extension extending toward the plug, and the plug includes a second extension extending toward the cap and guided by the first extension. Then, it is preferable that a spring is interposed between the cap and the plug to bias the plug toward the seat surface. It is still preferable that the cap is attached with a retainer extending from the cap toward the plug and locked to the second extension, and the retainer includes a disk-shaped base to receive one end of the spring. It is still preferable that an elastic member is arranged between the cap and the base of the retainer, and the base abuts on a stepped portion formed at a boundary between the first accommodation chamber and the second accommodation chamber, due to a biasing force of the elastic member.

This configuration allows the cap to be fixed to the accommodation chamber, with the base abutting on the stepped portion formed at the boundary between the first accommodation chamber and the second accommodation chamber, to prevent the cap from being moved due to negative or positive pressure in a device connected to a flow path. This prevents variation in stroke performance of the plug, to stabilize an installed load of the plug.

Still further, it is preferable that the elastic member has a spring constant greater than that of the spring. This configuration allows the base to remain abutted on the stepped portion, without being affected by expansion and contraction of the spring, to suitably prevent the cap from being moved. Accordingly, variation in stroke performance of the plug is prevented to further stabilize the installed load of the plug.

Still further, it is preferable that the base of the retainer is formed with a protrusion to position one end of the spring. This configuration allows one end of the spring to be positioned on the base, to have less chance of the plug having an unbalanced load when slid with respect to the cap. Accordingly, the sliding resistance is reduced and the surface pressure of the spring with respect to the plug is equalized, to improve seating performance of the plug.

Still further, it is preferable that the seat surface is flat, the plug has a flat seating surface to face the seat surface, and the seating surface is provided with a sealing member to abut on the seat surface.

This configuration allows the flat seating surface of the plug to be seated on the flat seat surface in the flow path, with the sealing member provided on the seated surface, so that what is executed is to seal a gap between two flat surfaces, to further improve sealing performance and durability. Sealing a gap between two flat surfaces also allows for increasing a diameter of the flow path while securing sealing performance. Accordingly, the check valve can be used in a large flow path.

Still further, it is preferable that a sealing point of the sealing member with respect to the seat surface is located radially inner than an abutting point of the spring abutting on the plug. This configuration allows the plug to be pressed over a wider area. This secures a sufficient level of the plug being parallel to the flat seat surface in the flow path, to also improve adhesiveness of the sealing member to the seat surface. Accordingly, sealing performance of the plug is improved with respect to the seat surface.

Still further, it is preferable that the sealing member includes a base portion, a ridge portion protruding from the base portion toward the seat surface, and a deformable portion continuous to the ridge portion, and abuts on the seat surface to seal one side in the flow path, acted on by hydraulic pressure of hydraulic fluid, from the other side in the flow path, not acted on by hydraulic pressure of hydraulic fluid. In this case, it is preferable that the deformable portion is deformable from said one side, acted on by hydraulic pressure of hydraulic fluid in the flow path, toward said the other side not acted on by hydraulic pressure of hydraulic fluid.

When hydraulic pressure of hydraulic fluid is low, for example, this configuration causes the ridge portion to abut on the seat surface, to seal said one side, acted on by hydraulic pressure of hydraulic fluid, from said the other side not acted on by hydraulic pressure of hydraulic fluid. In contrast, when hydraulic pressure of hydraulic fluid is medium or high, the deformable portion is deformed from said one side, acted on by hydraulic pressure of hydraulic fluid, toward said the other side not acted on by hydraulic pressure of hydraulic fluid, to seal one from the other. This implements a two-phased sealing correlating to hydraulic pressure of hydraulic fluid.

Still further, it is preferable that the ridge portion is positioned so as to be skewed to one part of a surface, to face the seat surface, of the sealing member, acted on by hydraulic pressure of hydraulic fluid, with respect to the other part of the surface, not acted on by hydraulic pressure of hydraulic fluid.

This configuration causes an area of said the other part of the surface, to face the seat surface, of the sealing member, not acted on by hydraulic pressure of the hydraulic fluid, to become wide to allow the deformable portion to be suitably deformed from said one part of the surface, acted on by hydraulic pressure of hydraulic fluid, toward said the other part of the surface, not acted on by hydraulic pressure of hydraulic fluid, when hydraulic pressure of hydraulic fluid is medium or high, for example. This improves the sealing performance.

Still further, it is preferable that a brake system provided with the check valve of the present invention includes a reservoir tank configured to store hydraulic fluid and a hydraulic pressure generator configured to generate hydraulic pressure to act on a wheel brake, and the check valve is arranged in a flow path from the reservoir tank to a component unit of the hydraulic pressure generator. This brake system aspirates and secures hydraulic fluid from the reservoir tank to the hydraulic pressure generator via the flow path. Additionally, the brake system suitably prevents hydraulic pressure generated by the hydraulic pressure generator from being transmitted toward the reservoir tank.

Advantageous Effects of the Invention

The present invention provides a check valve and a brake system to reduce manufacturing costs and suitably prevent grit and dust from entering therein.

BRIEF DESCRIPTION OF DRAWINGS

FIG. 14A illustrates the check valve of the present embodiment when assembled to the base body;

FIG. 14B illustrates the check valve of the present embodiment when the plug is open.

EMBODIMENTS OF THE INVENTION

Figure 1:
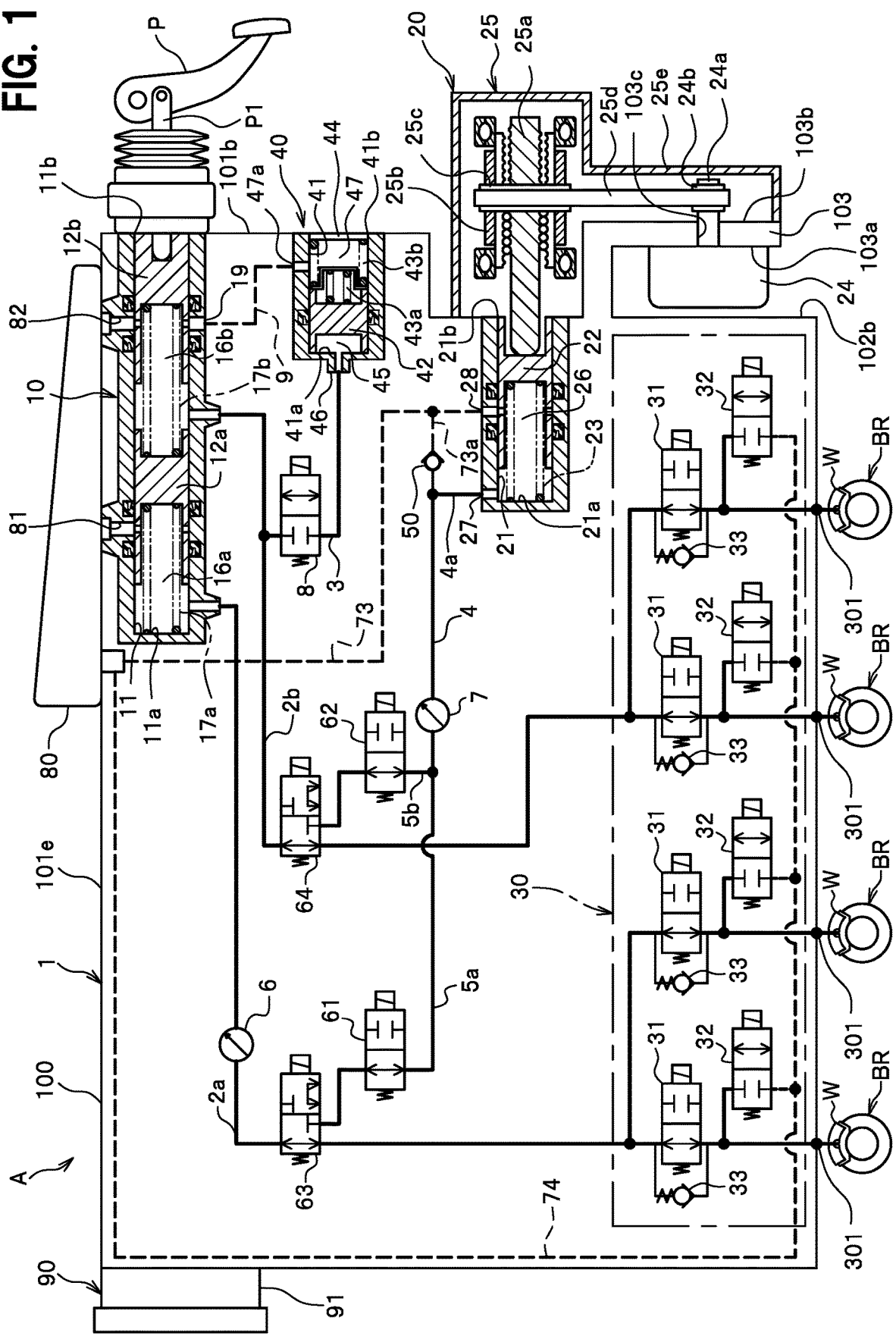
FIG. 1 is an overall block diagram to show a brake system applied with a check valve of the present embodiment.

Hereinafter, an embodiment for implementing the present invention is described in detail, with reference to the appended drawings. First, a description is given of a brake system provided with a check valve of the present embodiment. As shown in FIG. 1, a brake system A includes both a by-wire brake system to operate when a prime mover (engine, electric motor, and the like) is started, and a hydraulic brake system to operate when the prime mover is stopped.

The brake system A can be mounted on a hybrid vehicle that additionally uses a motor, an electric vehicle or a fuel cell vehicle that uses only the motor as a power source, and a vehicle that uses only an engine (internal engine) as a power source.

The brake system A includes a hydraulic pressure generator 1 to generate brake hydraulic pressure in proportion to a stroke amount (operation amount) of a brake pedal P (brake operator) and support stabilization of vehicle behavior.

The hydraulic pressure generator 1 includes a base body 100 and a master cylinder 10 to generate hydraulic pressure of brake fluid, as hydraulic fluid, in proportion to the stroke amount of the brake pedal P. In addition, the hydraulic pressure generator 1 includes, as component units, a stroke simulator 40 to apply a pseudo operation reaction force to the brake pedal P, and a slave cylinder 20 to generate brake hydraulic pressure using a motor 24 as a drive source. Further, the hydraulic pressure generator 1 includes, as component units, a hydraulic pressure control unit 30 to control hydraulic pressure of brake fluid acting on wheel cylinders W of a wheel brake BR and support stabilization of vehicle behavior, a reservoir tank 80, and an electronic control unit 90.

The base body 100 is a metal block mounted on a vehicle. The base body 100 is formed therein with three cylinder holes 11, 21, 41, hydraulic paths (flow paths) 2a, 2b, 3, 4, 5a, 5b, 73, 74, and the like. Additionally, the base body 100 has various parts, such as the reservoir tank 80 and the motor 24, attached thereto.

The first cylinder hole 11, the second cylinder hole 21, and the third cylinder hole 41 each have a bottomed cylindrical shape. The axes (not shown) of the cylinder holes 11, 21, 41 are aligned in parallel and in line. Ends of the cylinder holes 11, 21, 41 are open to surfaces 101b and 102b, which are part of the base body 100.

The master cylinder 10 is a tandem piston type having two first pistons 12a and 12b. The first cylinder hole 11 accommodates therein two coil springs 17a and 17b.

The coil spring 17a is arranged in a bottom-side pressure chamber 16a formed between a bottom surface 11a in the first cylinder hole 11 and the bottom-side first piston 12a. The coil spring 17a pushes the first piston 12a, which has been moved toward the bottom surface 11a, back toward an opening 11b. The coil spring 17b is arranged in an opening-side pressure chamber 16b formed between the first piston 12a and the opening-side first piston 12b. The coil spring 17b pushes the first piston 12b, which has been moved toward the bottom surface 11a, back toward the opening 11b.

A rod P1 of the brake pedal P is inserted into the first cylinder hole 11 and connected to the first piston 12b. Both the first pistons 12a and 12b receive pedal pressure of the brake pedal P and slide in the first cylinder hole 11, to pressurize brake fluid in the bottom-side pressure chamber 16a and the opening-side pressure chamber 16b.

The reservoir tank 80 is a container to store brake fluid, and is attached to a surface 101e of the base body 100. Two fluid supply portions projecting from the reservoir tank 80 are inserted into two reservoir union ports 81 and 82 formed in the surface 101e of the base body 100. This allows brake fluid to be replenished in the bottom-side pressure chamber 16a and the opening-side pressure chamber 16b.

The stroke simulator 40 includes a third piston 42 inserted into the third cylinder hole 41, a lid member 44 to close an opening 41b of the third cylinder hole 41, and two coil springs 43a and 43b housed between the third piston 42 and the lid member 44.

A bottom surface 41a of the third cylinder hole 41 and the third piston 42 defines a pressure chamber 45 therebetween. The pressure chamber 45 leads to the opening-side pressure chamber 16b of the first cylinder hole 11 via the branch hydraulic path 3 and the second main hydraulic path 2b, which are to be described below. In the stroke simulator 40, brake fluid pressure generated in the opening-side pressure chamber 16b of the master cylinder 10 moves the third piston 42 against a biasing force of the coil springs 43a and 43b. This applies a pseudo operation reaction force to the brake pedal P.

The slave cylinder 20 is of a single piston type and includes a second piston 22 inserted in the second cylinder hole 21, a coil spring 23 housed in the second cylinder hole 21, the motor 24, and a drive transmission unit 25.

A bottom surface 21a in the second cylinder hole 21 and the second piston 22 defines a pressure chamber (hydraulic pressure chamber) 26 therebetween. The pressure chamber 26 houses the coil spring 23 therein. The coil spring 23 pushes the second piston 22, which has been moved toward the bottom surface 21a, back toward an opening 21b.

The motor 24 is an electric servomotor to be driven and controlled by the electronic control unit 90. The motor 24 is attached to a flange 103 of the base body 100. An output shaft 24a of the motor 24 projects to the other side of the flange 103 through an insertion hole 103c formed in the flange 103. The output shaft 24a has a driving pulley 24b attached thereto.

The drive transmission unit 25 is a mechanism to convert a rotational driving force of the output shaft 24a of the motor 24 into a linear axial force. The drive transmission unit 25 includes a rod 25a, a cylindrical nut member 25b surrounding the rod 25a, a driven pulley 25c provided all around the nut member 25b, an endless belt 25d wound around the driven pulley 25c and the driving pulley 24b, and a cover member 25e.

The rod 25a is inserted into the second cylinder hole 21 through the opening 21b of the second cylinder hole 21, and an end of the rod 25a abuts on the second piston 22. A ball screw mechanism is provided between an outer peripheral surface of the rod 25a and an inner peripheral surface of the nut member 25b.

When the output shaft 24a is rotated, a rotational driving force thereof is inputted to the nut member 25b via the driving pulley 24b, the belt 25d, and the driven pulley 25c. Then, the ball screw mechanism between the nut member 25b and the rod 25a applies a linear axial force to the rod 25a, and the rod 25a is moved back and forth in the axial direction. When the rod 25a is moved toward the bottom surface 21a, the second piston 22 receives the input from the rod 25a and slides in the second cylinder hole 21 to pressurize the brake fluid in the pressure chamber 26.

Next, a description is given of the hydraulic paths formed in the base body 100. As shown in FIG. 1, the two main hydraulic paths 2a and 2b are hydraulic paths starting from the first cylinder hole 11 of the master cylinder 10. The first main hydraulic path 2a is connected to the two wheel brakes BR from the bottom-side pressure chamber 16a of the master cylinder 10 via the hydraulic pressure control unit 30. The second main hydraulic path 2b is connected to the other two wheel brakes BR from the opening-side pressure chamber 16b of the master cylinder 10 via the hydraulic pressure control unit 30.

The branch hydraulic path 3 is a hydraulic path from the pressure chamber 45 of the stroke simulator 40 to the second main hydraulic path 2b. The branch hydraulic path 3 is provided with a normally-closed solenoid valve 8. The normally-closed solenoid valve 8 opens and closes the branch hydraulic path 3.

The two communication paths 5a and 5b are hydraulic paths starting from the second cylinder hole 21 of the slave cylinder 20. Both the communication paths 5a and 5b join the common hydraulic path 4 and a discharging fluid path 4a, and lead to the second cylinder hole 21. The first communication path 5a is a flow path from the pressure chamber 26 in the second cylinder hole 21 to the first main hydraulic path 2a, and the second continuous path 5b is a flow path from the pressure chamber 26 to the second main hydraulic path 2b.

A first switching valve 63, which is a three-way valve, is provided at a connection point between the first main hydraulic path 2a and the first communication path 5a. The first switching valve 63 is a solenoid valve with two positions and three ports. When the first switching valve 63 is in a first position shown in FIG. 1, an upstream side (closer to the master cylinder 10) and a downstream side (closer to the wheel brakes BR) of the first main hydraulic path 2a communicate with each other, while the first main hydraulic path 2a is shut off from the first communication path 5a. When the first switching valve 63 is in a second position, the upstream side of the first main hydraulic path 2a is shut off from the downstream side, while the first communication path 5a and the downstream side of the first main hydraulic path 2a communicate with each other.

A second switching valve 64, which is a three-way valve, is provided at a connection point between the second main hydraulic path 2b and the second communication path 5b. The second switching valve 64 is a solenoid valve with two position and three ports. When the second switching valve 64 is in a first position shown in FIG. 1, an upstream side (closer to the master cylinder 10) and a downstream side (closer to the wheel brakes BR) of the second main hydraulic path 2b communicate with each other, while the second main hydraulic path 2b is shut off from the second communication path 5b. When the second switching valve 64 is in a second position, the upstream side of the second main hydraulic path 2b is shut off from the downstream side, while the second communication path 5b and the downstream side of the second main hydraulic path 2b communicate with each other.

The first communication path 5a is provided with a first shutoff valve 61. The first shutoff valve 61 is a normally-open solenoid valve. When the first shutoff valve 61 is closed while energized, the first communication path 5a is shut off in the first shutoff valve 61. The second communication path 5b is provided with a second shutoff valve 62. The second shutoff valve 62 is a normally-open solenoid valve. When the second shutoff valve 62 is closed while energized, the second communication path 5b is shut off in the second shutoff valve 62.

Two pressure sensors 6 and 7 detect magnitude of brake fluid pressure, and information obtained by both the pressure sensors 6 and 7 is outputted to the electronic control unit 90. The first pressure sensor 6 is arranged on an upstream side of the first switching valve 63 and detects brake fluid pressure generated in the master cylinder 10. The second pressure sensor 7 is arranged on a downstream side of the second switching valve 64 and, when the two communication paths 5a and 5b and the downstream sides of both the main hydraulic paths 2a and 2b communicate with each other, detects brake fluid pressure generated by the slave cylinder 20.

The slave cylinder supply path 73 is a flow path from the reservoir tank 80 to the slave cylinder 20. The slave cylinder supply path 73 is connected to the common hydraulic path 4 via a branch supply path 73a. The branch supply path 73a is provided with a check valve 50 to allow brake fluid to flow only in a direction from the reservoir tank 80 to the common hydraulic path 4 (or to the slave cylinder 20). As the check valve 50 is provided in the branch supply path 73a, the check valve 50 suitably prevents hydraulic pressure generated in the slave cylinder 20 from being transmitted toward the reservoir tank 80.

Normally, the brake fluid is replenished from the reservoir tank 80 to the slave cylinder 20 through the slave cylinder supply path 73. Alternatively, at a time of fluid aspiration control to be described below, brake fluid is aspirated from the reservoir tank 80 to the slave cylinder 20 through a supply path including the slave cylinder supply path 73, the branch supply path 73*a*, the check valve 50, the discharging fluid path 4*a*, and a discharge port 27.

The return fluid path 74 is a flow path from the hydraulic pressure control unit 30 to the reservoir tank 80. The brake fluid released from the wheel cylinders W flows into the return fluid path 74 via the hydraulic pressure control unit 30. The brake fluid released into the return fluid path 74 is returned to the reservoir tank 80 through the return fluid path 74.

The hydraulic pressure control unit 30 suitably controls hydraulic pressure of brake fluid acting on the wheel cylinders W of the wheel brakes BR. The hydraulic pressure control unit 30 has a configuration capable of executing anti-lock brake control. The wheel cylinders W are respectively connected to outlet ports 301 of the base body 100 via pipes.

The hydraulic pressure control unit 30 increases, holds, or decreases hydraulic pressure acting on the wheel cylinders W (hereinbelow, referred to as "wheel cylinder pressure"). The hydraulic pressure control unit 30 includes an inlet valve 31, an outlet valve 32, and a check valve 33.

The inlet valve 31 is arranged for each of two hydraulic paths from the first main hydraulic path 2*a* to the two wheel brakes BR, and for each of two hydraulic paths from the second main hydraulic path 2*b* to the two wheel brakes BR. The inlet valve 31 is a normally-open proportional solenoid valve (linear solenoid valve), and valve opening pressure of the inlet valve 31 is adjustable in proportion to a current value flowing through a coil of the inlet valve 31. The inlet valve 31 is normally open to allow hydraulic pressure to be applied from the slave cylinder 20 to the wheel cylinder W. The inlet valve 31 closes under the control of the electronic control unit 90 when the wheels are about to be locked, to shut off the brake fluid pressure to be applied to the wheel cylinder W.

The outlet valve 32 is a normally-closed solenoid valve arranged between the wheel cylinder W and the return fluid path 74. The outlet valve 32 is normally closed, but opened under the control of the electronic control unit 90 when the wheels are about to be locked.

The check valve 33 is connected in parallel to the inlet valve 31. The check valve 33 is a valve to allow brake fluid to flow only in a direction from the wheel cylinder W to the slave cylinder 20 (or to the master cylinder 10). Therefore, the check valve 33 allows brake fluid to flow in a direction from the wheel cylinder W to the slave cylinder 20, even when the inlet valve 31 is closed.

The electronic control unit 90 includes a housing 91 as a box made of resin, and a control board (not shown) housed in the housing 91. The base body 100 is formed with a mounting surface for the electronic control unit 90. The electronic control unit 90 controls operation of the motor 24 and opening/closing of the valves, based on information obtained from various sensors, such as both the pressure sensors 6, 7 and a stroke sensor (not shown), and a program stored in advance.

In addition, the electronic control unit 90 has a function of executing fluid aspiration control. The fluid aspiration control controls positively aspirating the brake fluid into the slave cylinder 20 from the reservoir tank 80 via the slave cylinder supply path 73 (check valve 50). This secures an amount of brake fluid in the slave cylinder 20. The fluid aspiration control is executed when brake fluid is desired to be secured for pressurizing by the slave cylinder 20 up to a high hydraulic pressure level, for example. The fluid aspiration control is also executed in a case where the brake fluid is secured in advance in preparation for subsequent pressurization, with fluid pressure generated by the slave cylinder 20 having reached a level (normal level) required by a driver.

Next, a description is briefly given of operation of the brake system A. In the brake system A in FIG. 1, both the switching valves 63 and 64 are excited to switch from the first position to the second position, when the system is activated. This causes the downstream side of the first main hydraulic path 2*a* to communicate with the first communication path 5*a*, and causes the downstream side of the second main hydraulic path 2*b* to communicate with the second communication path 5*b*. Then, the master cylinder 10 is shut off from the wheel cylinders W, while the slave cylinder 20 and the wheel cylinders W communicate with each other.

In addition, the normally-closed solenoid valve 8 in the branch hydraulic path 3 is opened, when the system is activated. This causes hydraulic pressure generated in the master cylinder 10 by operation of the brake pedal P to be transmitted to the stroke simulator 40, instead of being transmitted to the wheel cylinders W. When hydraulic pressure in the pressure chamber 45 of the stroke simulator 40 increases, the third piston 42 is moved toward the lid member 44 against biasing forces of the coil springs 43*a* and 43*b*. This allows stroking of the brake pedal P, to apply a pseudo operation reaction force to the brake pedal P.

When the stroke sensor (not shown) detects that the brake pedal P has been stepped, the electronic control unit 90 drives the motor 24 of the slave cylinder 20, to move the second piston 22 of the slave cylinder 20 toward the bottom surface 21*a*. This causes brake fluid in the pressure chamber 26 to be pressurized. The electronic control unit 90 compares hydraulic pressure generated by the slave cylinder 20 (hydraulic pressure detected by the second pressure sensor 7) with required hydraulic pressure corresponding to the operation amount of the brake pedal P, and controls the rotation speed of the motor 24 and the like, based on a comparison result. In this way, the brake system A increases hydraulic pressure in proportion to the operation amount of the brake pedal P. Then, hydraulic pressure generated by the slave cylinder 20 is inputted to the hydraulic pressure control unit 30.

When the stepping of the brake pedal P is released, the motor 24 of the slave cylinder 20 is reversely driven by the electronic control unit 90, to return the second piston 22 toward the motor 24 by the coil spring 23. This causes pressure inside the pressure chamber 26 to be decreased.

In the hydraulic pressure control unit 30, opening/closing of the inlet valve 31 and the outlet valve 32 is controlled by the electronic control unit 90, to adjust wheel cylinder pressure of the wheel cylinder W. In a normal state with the inlet valve 31 opened and the outlet valve 32 closed, for example, hydraulic pressure generated in the slave cylinder 20 is directly transmitted to the wheel cylinder W, when the brake pedal P has been stepped, to increase wheel cylinder pressure. In a state with the inlet valve 31 closed and the outlet valve 32 opened, the brake fluid flows out from the wheel cylinder W toward the return fluid path 74, to decrease wheel cylinder pressure. In a state with both the inlet valve 31 and the outlet valve 32 closed, the wheel cylinder pressure is maintained.

Note that when the slave cylinder 20 is not in operation (when the ignition is turned off or power is not available, for example), the first switching valve 63, the second switching valve 64, and the normally-closed solenoid valve 8 each return to an initial state. This causes the upstream sides of both the main hydraulic paths 2a and 2b to communicate with the downstream sides thereof, respectively. In this state, hydraulic pressure generated in the master cylinder 10 is transmitted to the wheel cylinders W via the hydraulic pressure control unit 30.

Figure 2:
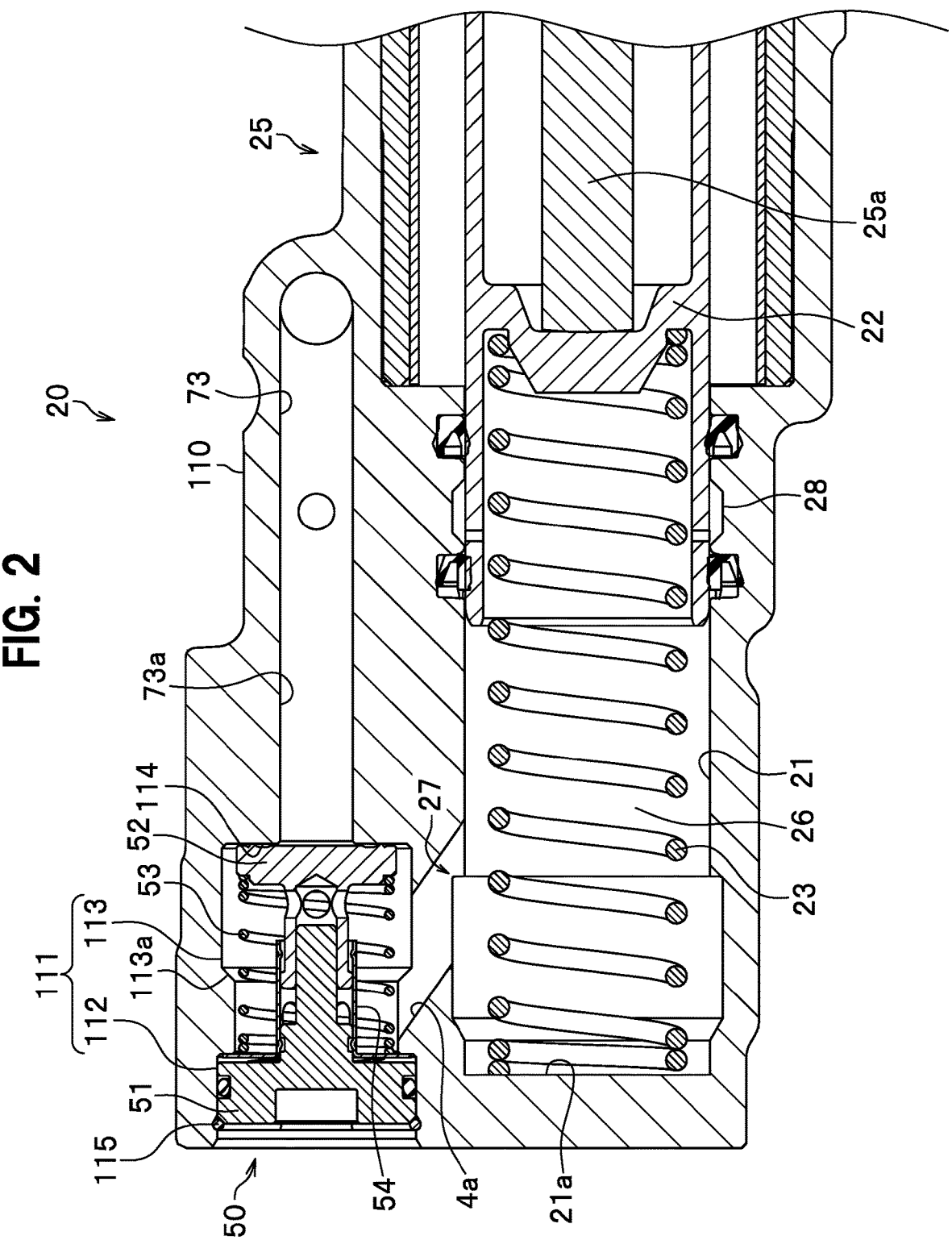
FIG. 2 is a cross-sectional view of a hydraulic pressure generator provided in the brake system of the present embodiment, showing main parts thereof.

Next, the check valve 50 (see FIG. 1) is described. The check valve 50 is arranged in vicinity to the discharge port 27 of the slave cylinder 20, as shown in FIG. 2. In particular, the check valve 50 is arranged at an end portion of the base body 100 where the second cylinder hole 21 is formed.

The check valve 50 is installed in a stepped accommodation chamber 111 having a circular cross section to communicate with the branch supply path 73a. The accommodation chamber 111 is open to an end surface of the base body 100. The accommodation chamber 111 includes a large-diameter portion 112 having a large diameter, as a first accommodation chamber, and a small-diameter portion 113 having a smaller diameter than the large-diameter portion 112, as a second accommodation chamber. The small-diameter portion 113 is formed to have a larger diameter, with a stepped portion 113a as a boundary. The small-diameter portion 113 is formed with a flat seat surface 114. The seat surface 114 is open, in a radially center thereof, to the branch supply path 73a. The branch supply path 73a communicates with the slave cylinder supply path 73.

Figure 3:
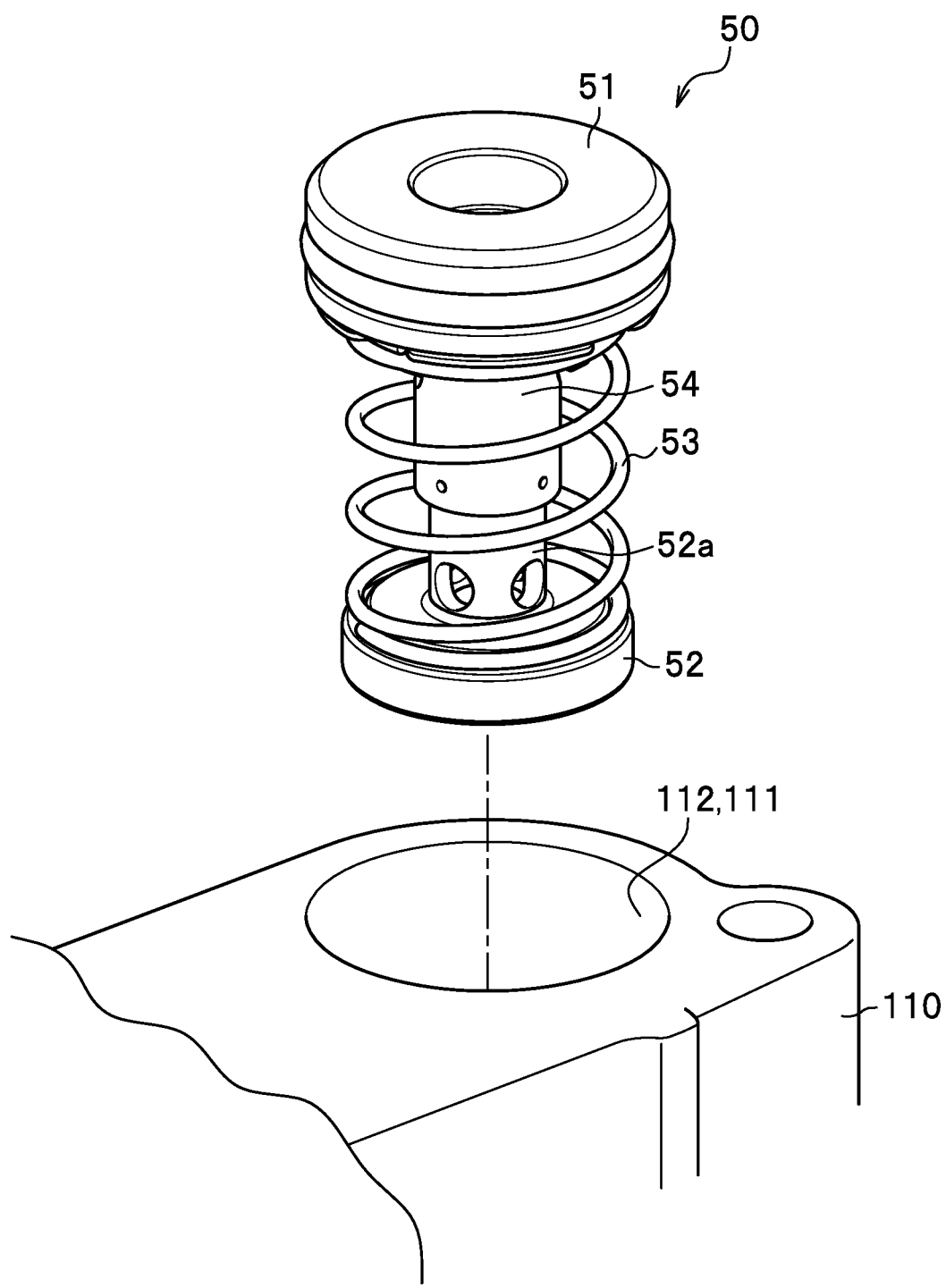
FIG. 3 is a perspective view of a check valve of the present embodiment, when attached to a base body of a slave cylinder.

The check valve 50 includes a cap 51, a plug 52, a spring 53, and a retainer 54. As shown in FIG. 3, the check valve 50 is configured wholly as a unit (multiple-part combined product). Accordingly, the check valve 50 is assembled in the accommodation chamber 111 of the base body 110 as a multiple-part combined product.

Figure 4:
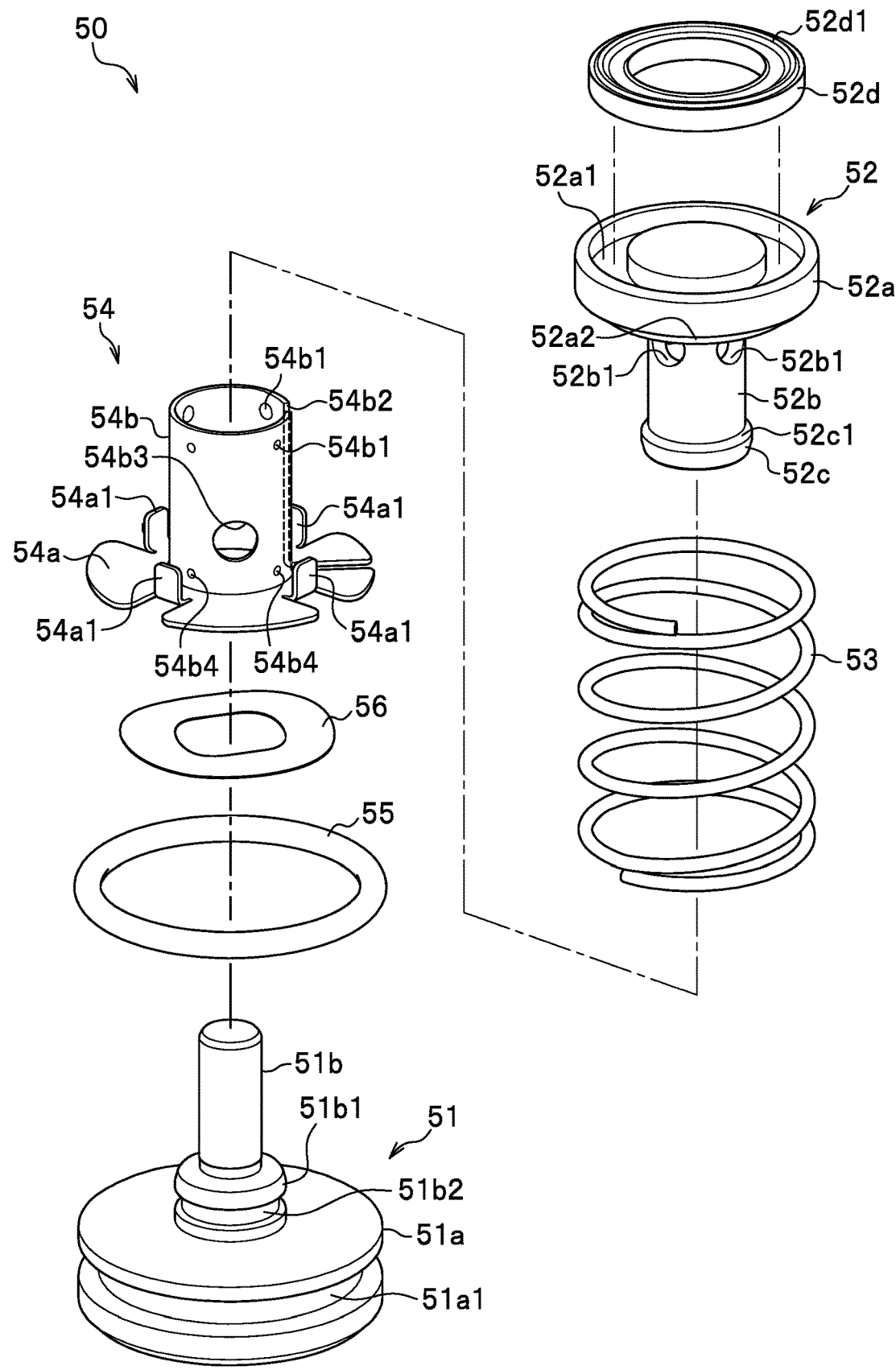
FIG. 4 is an exploded perspective view of the check valve of the present embodiment.
Figure 5:
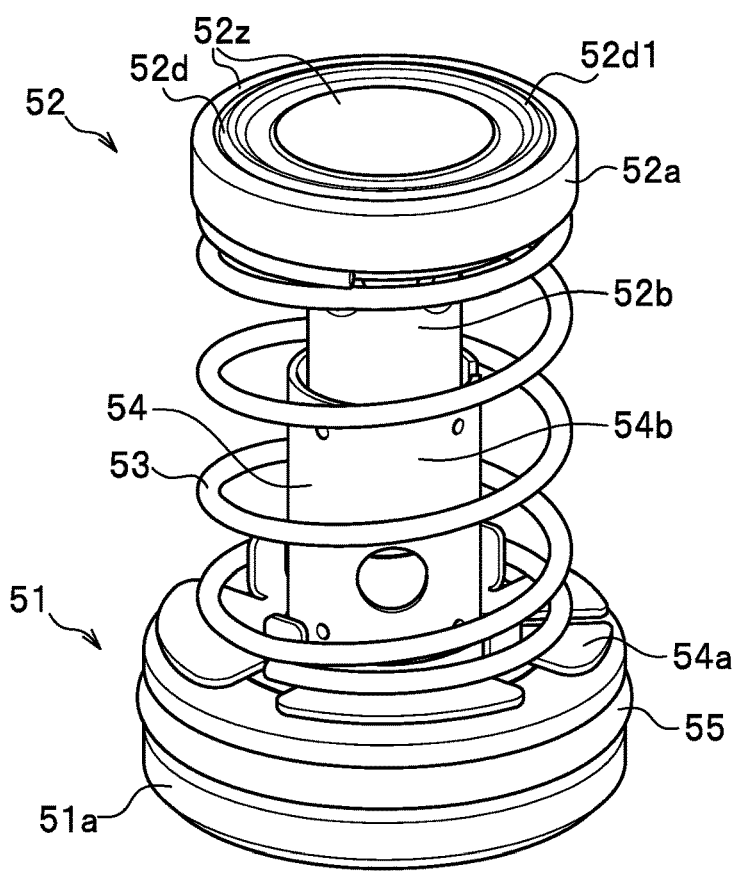
FIG. 5 is a perspective view of the check valve of the present embodiment.

As shown in FIG. 2, the cap 51 is accommodated in the large-diameter portion 112 of the accommodation chamber 111, and prevented by a C ring 115, attached to an inner surface closer to an opening of the base body 100, from coming out of the accommodation chamber 111. As shown in FIG. 4, the cap 51 includes a disk-shaped cap base 51a and a columnar first extension 51b extending from the cap base 51a toward the plug 52.

The cap base 51a is formed, in an outer peripheral surface thereof, with a peripheral groove 51a1. The peripheral groove 51a1 has an O-ring 55 mounted thereon to work as a sealing member. The O-ring 55 closely contacts an inner peripheral surface of the accommodation chamber 111, to seal the accommodation chamber 111 in a liquid-tight manner.

Figure 7:
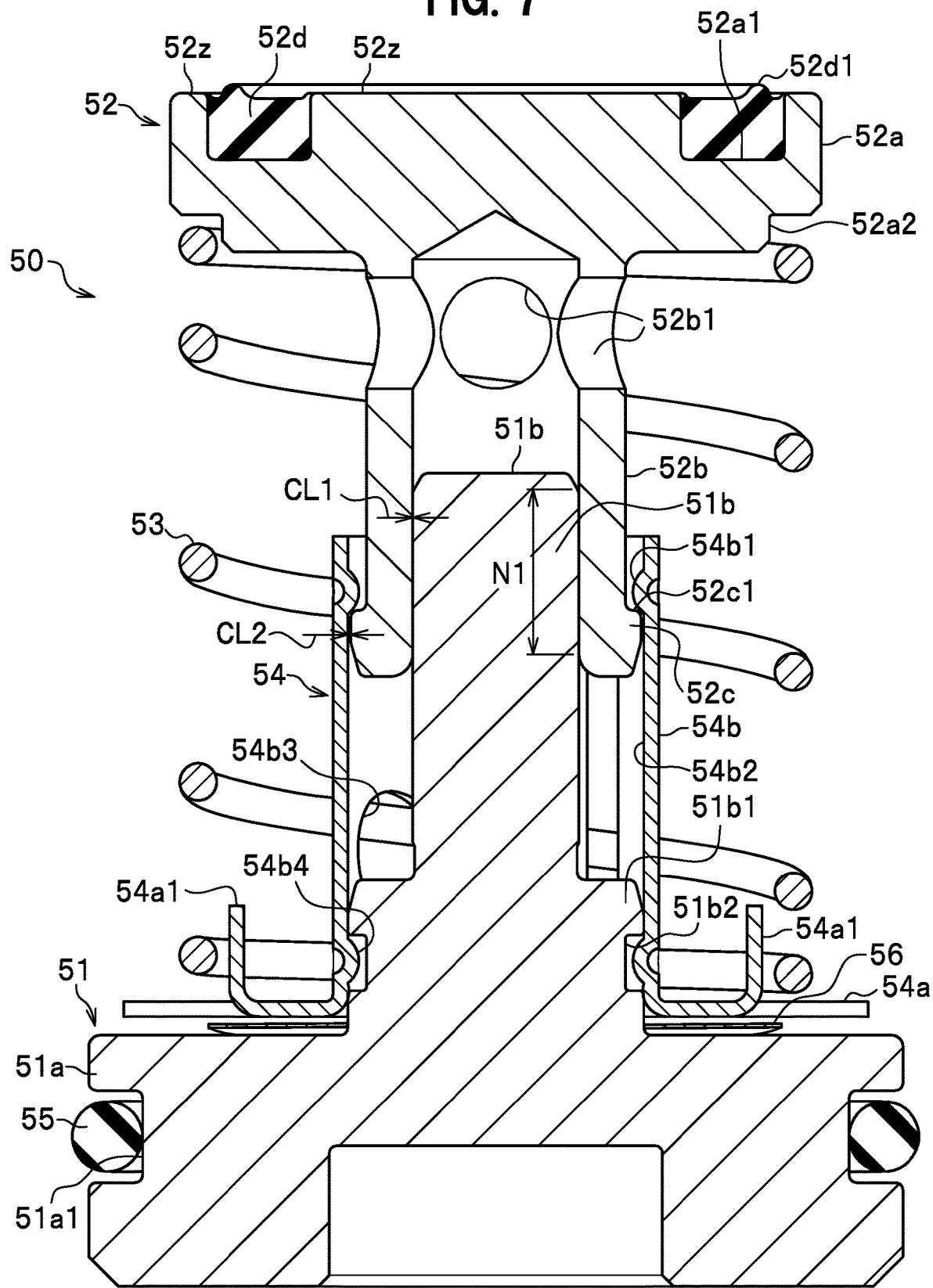
FIG. 7 is an enlarged vertical cross-sectional view of the check valve of the present embodiment.

The first extension 51b is integrally provided with the cap base 51a. The first extension 51b has a base end portion 51b1, connected to the cap base 51a, formed to have a larger diameter than the rest thereof. The base end portion 51b1 is formed, in an outer peripheral surface thereof, with a peripheral groove 51b2 as a groove. As shown in FIG. 7, majority of the first extension 51b is positioned inside the retainer 54.

As shown in FIG. 2, the plug 52 is a member accommodated in the small-diameter portion 113 of the accommodating chamber 111, and seated on or separated from the seat surface 114 (see FIGS. 14A and 14B). As shown in FIGS. 4 to 7, the plug 52 includes a disk-shaped plug base 52a and a cylindrical second extension 52b extending from the plug base 52a toward the cap 51.

Figure 8:
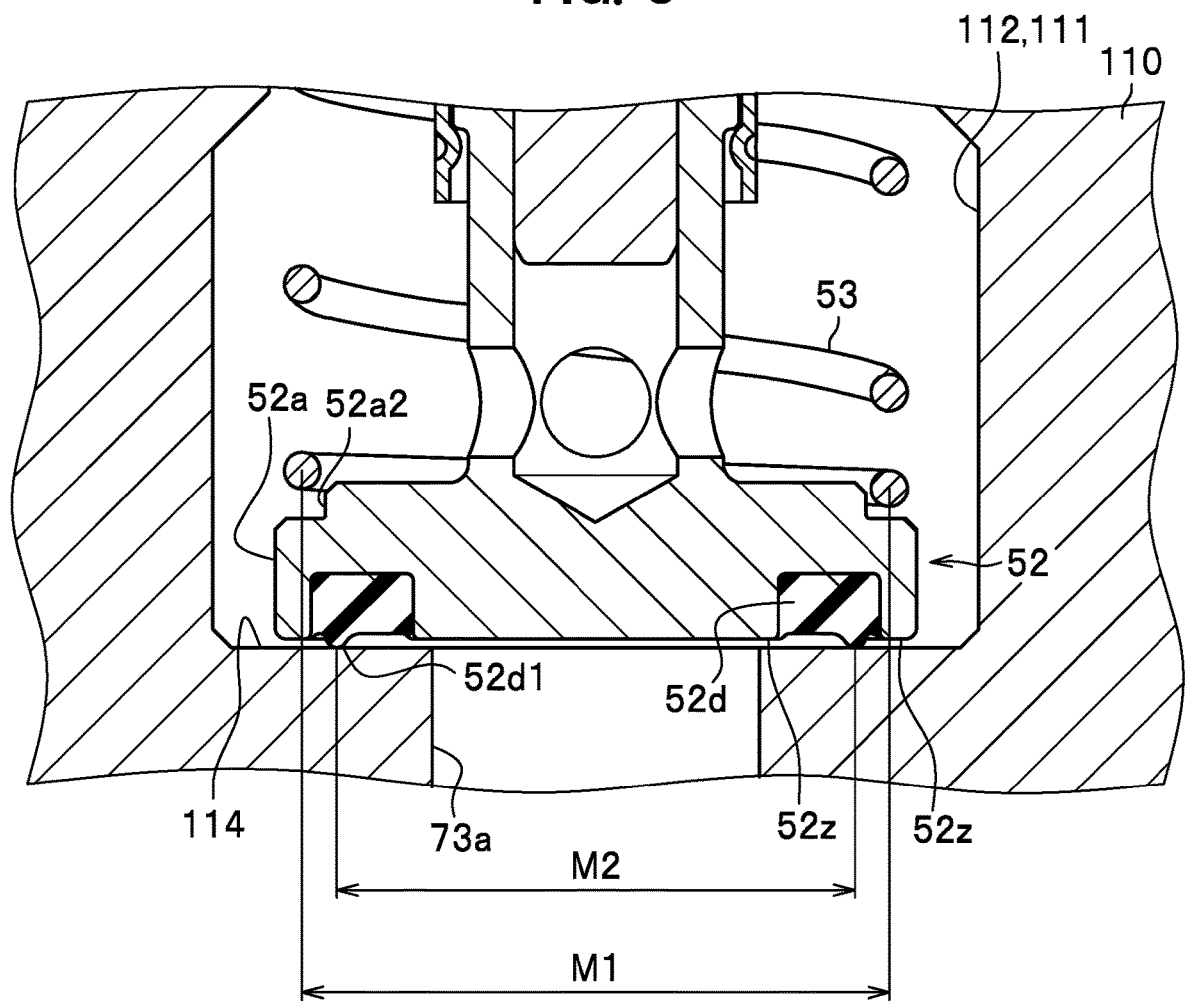
FIG. 8 is cross-sectional view of the check valve of the present embodiment, to show a relationship between a sealing member and an end of a spring, which are mounted to a plug.

The plug base 52a has a flat seating surface 52z facing the seat surface 114 of the accommodation chamber 111. The seating surface 52z is formed therein with an annular groove 52a1 concentric with the plug base 52a. The annular groove 52a1 is mounted therein with an annular sealing member 52d to seal a gap between the seating surface 52z of the plug base 52a and the seating surface 114 of the accommodation chamber 111 (FIG. 8). The sealing member 52d seals the accommodation chamber 111, acted on by hydraulic pressure of brake fluid in the flow path, from the branch supply path (at atmospheric pressure) 73a not acted on by hydraulic pressure of brake fluid. The seating surface 52z of the plug base 52a and the seat surface 114 of the accommodation chamber 111 are formed flat so as to closely contact with each other. The sealing member 52d is made of rubber and is fixed in the annular groove 52a1 by vulcanization adhesion or the like.

In the present embodiment, one side in the flow path, connected to the pressure chambers 16a, 16b, 26, is acted on by hydraulic pressure of brake fluid, while the other side in the flow path, connected to the reservoir tank 80, is not acted on by hydraulic pressure of brake fluid.

Figure 9:
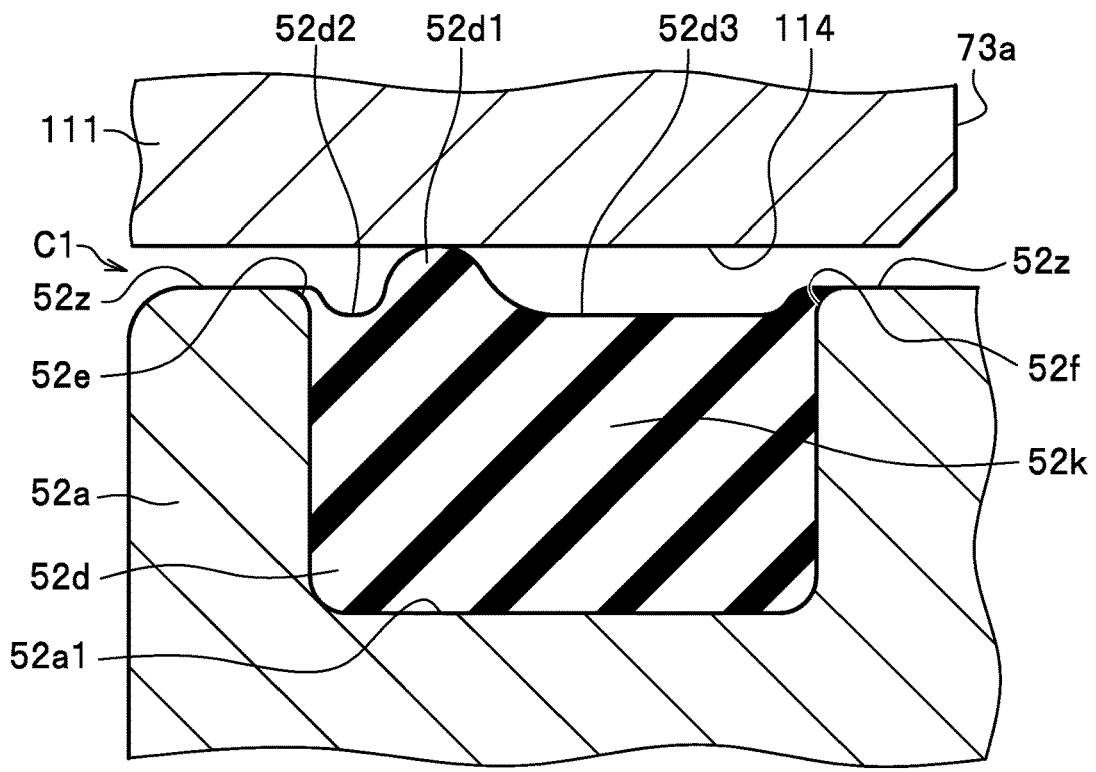
FIG. 9 is an enlarged cross-sectional view of the check valve of the present embodiment, to show the sealing member when assembled.

As shown in FIG. 9, the sealing member 52d includes a base portion 52k, an annular ridge portion 52d1, an annular radially outer portion 52d2, and an annular radially inner portion 52d3. The base portion 52k is a portion fixed into the annular groove 52a1. The ridge portion 52d1 protrudes, in a rounded mountain shape in cross section, from the base portion 52k toward the seat surface 114 of the accommodation chamber 111. The ridge portion 52d1 protrudes with respect to the seating surface 52z of the plug base 52a and works as a sealing point to abut on the seat surface 114 to close the branch supply path 73a.

In addition, the ridge portion 52d1 is positioned on a surface, to face the seat surface 114, of the sealing member 52d, so as to be radially skewed to a region of the surface, acted on by hydraulic pressure of brake fluid in the hydraulic path, with respect to another region of the surface, not acted on by hydraulic pressure of the brake fluid. That is, the ridge portion 52d1 is skewed in the radial direction of the sealing member 52d to the radially outer portion 52d2. This secures a large area of the radially inner portion 52d3.

In an initial state of the check valve 50 installed (assembled) in the accommodation chamber 111, a tip end portion of the ridge portion 52d1 abuts on the seat surface 114 of the accommodation chamber 111 by a biasing force of the spring 53 of the check valve 50, as shown in FIG. 9. This causes the seating surface 52z of the plug base 52a not to closely contact the seat surface 114 of the accommodation chamber 111, to define a clearance C1 therebetween. Note that a certain level of surface pressure is applied in the initial state to the ridge portion 52d1l, to allow for sealing brake fluid pressure in atmospheric pressure or extremely low pressure.

The radially outer portion 52d2 has a substantially U-shape in cross section, and is recessed from the seating surface 52z of the plug base 52a toward a direction away from the seat surface 114 of the accommodation chamber 111 (toward a bottom of the annular groove 52a1). The radially outer portion 52d2 is adjacent to a radially outer side of the ridge portion 52d1, and an inner end thereof is continuous to the radially outer side of the ridge portion 52d1. An outer end of the radially outer portion 52d2 is joined to an outer opening edge 52e of the annular groove 52a1. The radially outer portion 52d2 flexibly extends inward in the radial direction when the radially inner portion 52d3 receives brake fluid pressure and is deformed inward in the radial direction, as will be described below.

The radially inner portion 52d3 has a substantially inverted trapezoidal shape in cross section, and is recessed from the seating surface 52z of the plug base 52a toward a direction being away from the seat surface 114 of the accommodation chamber 111 (toward a bottom in the annular groove 52a1). The radially inner portion 52d3 is adjacent to a radially inner side of the ridge portion 52d1, and an outer end thereof is continuous to the radially inner side of the ridge portion 52d1. An inner end of the radially inner portion 52d3 is joined to an inner opening edge 52f of the annular groove 52a1.

The radially inner portion 52d3 is a portion corresponding to a deformed portion to be deformed by brake fluid pressure. The radially inner portion 52d3 is deformed radially inward by increased brake fluid pressure, together with the ridge portion 52d1, and bulging toward, and abutting on, the seat surface 114 (see FIG. 11).

Figure 10:
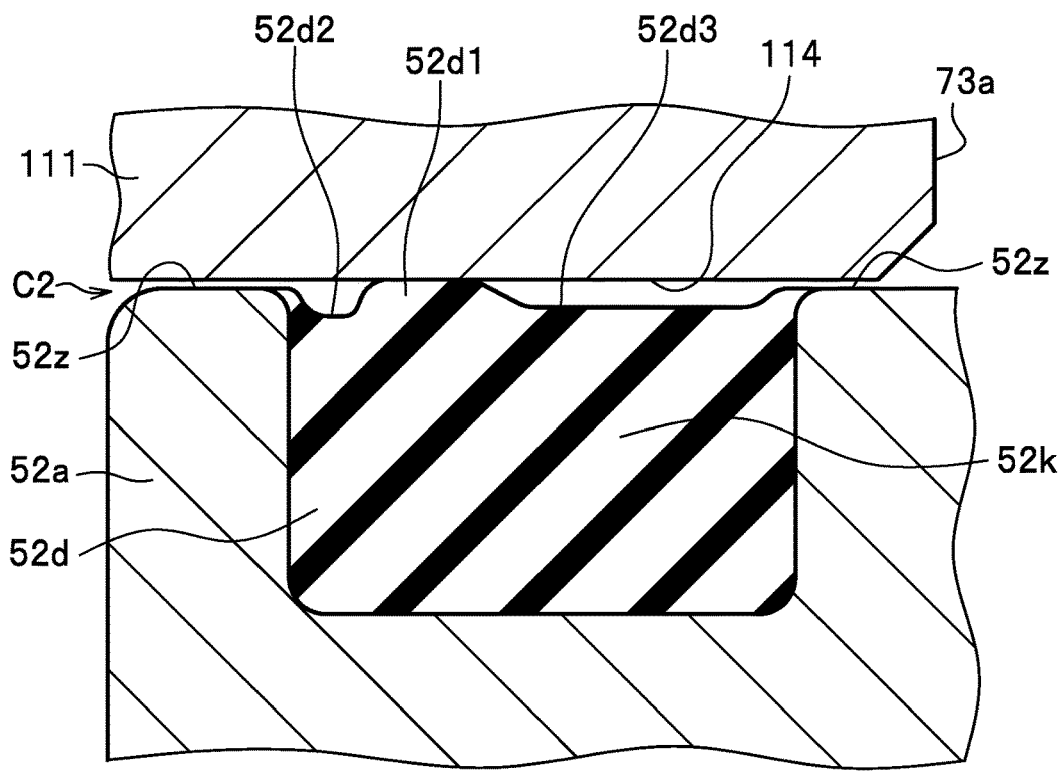
FIG. 10 is an enlarged cross-sectional view of the check valve of the present embodiment, to show the sealing member when fluid pressure is low.
Figure 11:
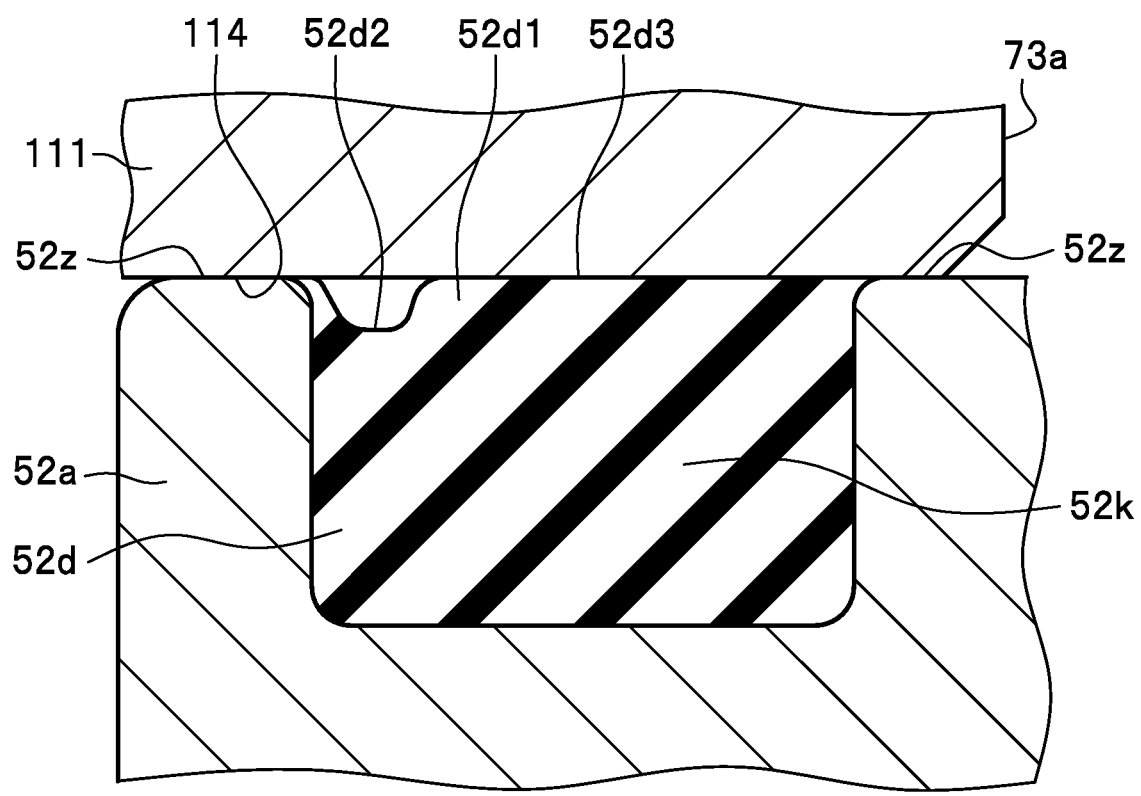
FIG. 11 is an enlarged cross-sectional view of the check valve of the present embodiment, to show the sealing member when fluid pressure is high.
Figure 12:
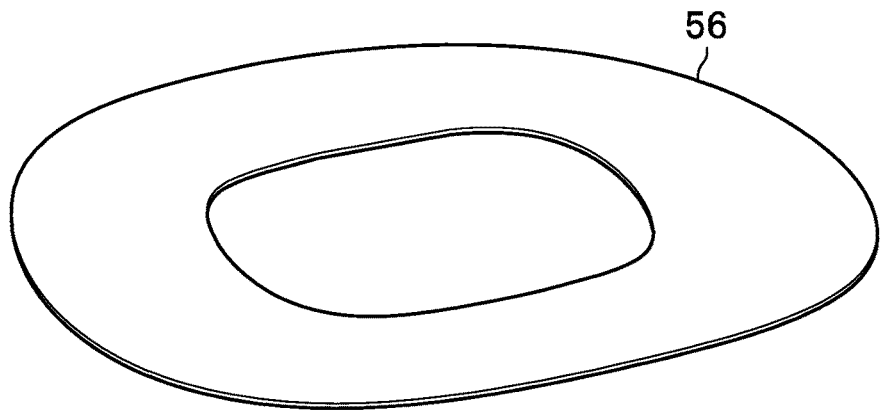
FIG. 12 is an enlarged perspective view of an elastic member to be assembled to the check valve of the present embodiment.
Figure 13A:
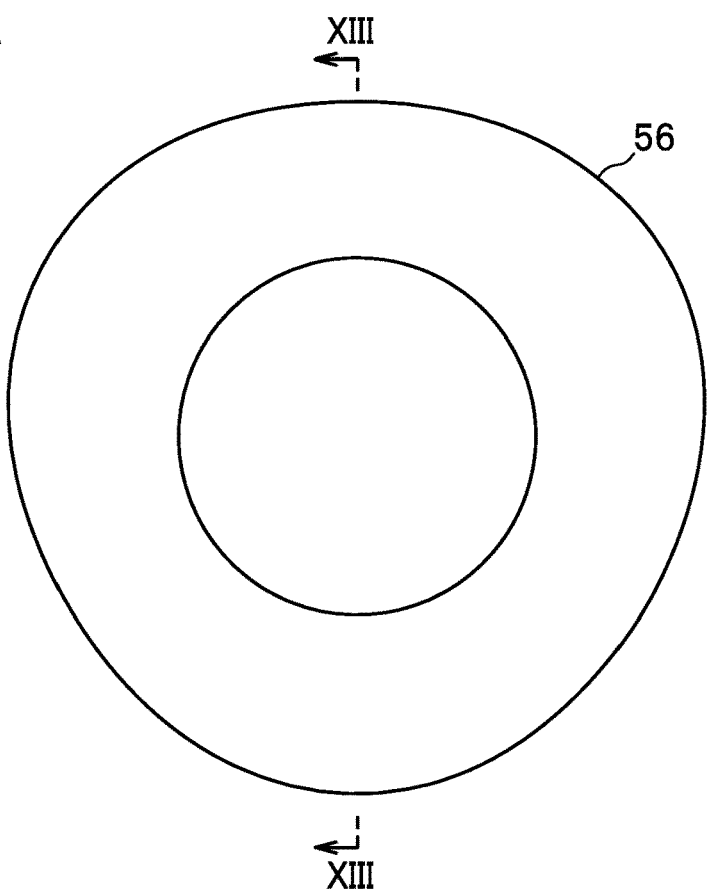
FIG. 13A is an enlarged plan view of the elastic member to be assembled to the check valve of the present embodiment.
Figure 13B:
FIG. 13B is an enlarged side view of the elastic member to be assembled to the check valve of the present embodiment.
Figure 13C:
FIG. 13C is a cross-sectional view of the elastic member, taken along a line XIII-XIII in FIG. 13A.

Next, a description is given of a change in a cross-sectional shape of the sealing member 52d, with reference to FIGS. 10 and 11. FIG. 10 shows the sealing member 52d when fluid pressure is low. When fluid pressure is low means when a relatively low brake fluid pressure acts on the plug base 52a through the accommodation chamber 111, such as when the brake pedal P is pedaled relatively lightly or during initial operation of the brake pedal P.

When fluid pressure is low, the tip of the ridge portion 52d1 abuts on the seat surface 114 of the accommodating chamber 111 while being given in to fluid pressure, to define a clearance C2 between the seating surface 52z of the plug base 52a and the seat surface 114 of the accommodating chamber 111, which is smaller than the clearance C1 in the above-described initial state. Note that predetermined surface pressure is applied to the ridge portion 52d1, to allow for sealing brake fluid at low pressure.

FIG. 11 shows the sealing member 52d when fluid pressure is high. When fluid pressure is high means when brake fluid pressure, higher than that when the fluid pressure is low, is acting on the plug base 52a through the accommodating chamber 111, such as when the brake pedal P is kept pedaled hard.

When the fluid pressure is high, the seating surface 52z of the plug base 52a abuts on, and closely contacts, the seat surface 114 of the accommodation chamber 111. When fluid pressure is high, the radially inner portion 52d3 is then deformed by brake fluid pressure, larger than that when fluid pressure is low, toward a radially inner location at atmospheric pressure (toward the branch supply path 73a). This causes the radially inner portion 52d3 to bulge toward the seat surface 114 so that the entire surface to face the seat surface 114 closely contacts the seat surface 114. At this time, a predetermined surface pressure is applied to the radially inner portion 52d3, to allow for sealing the brake fluid when the fluid pressure is high. Note that the radially outer portion 52d2 flexibly extends inward in the radial direction when the fluid pressure is high, to allow the radially inner portion 52d3 to be smoothly deformed.

Figure 6:
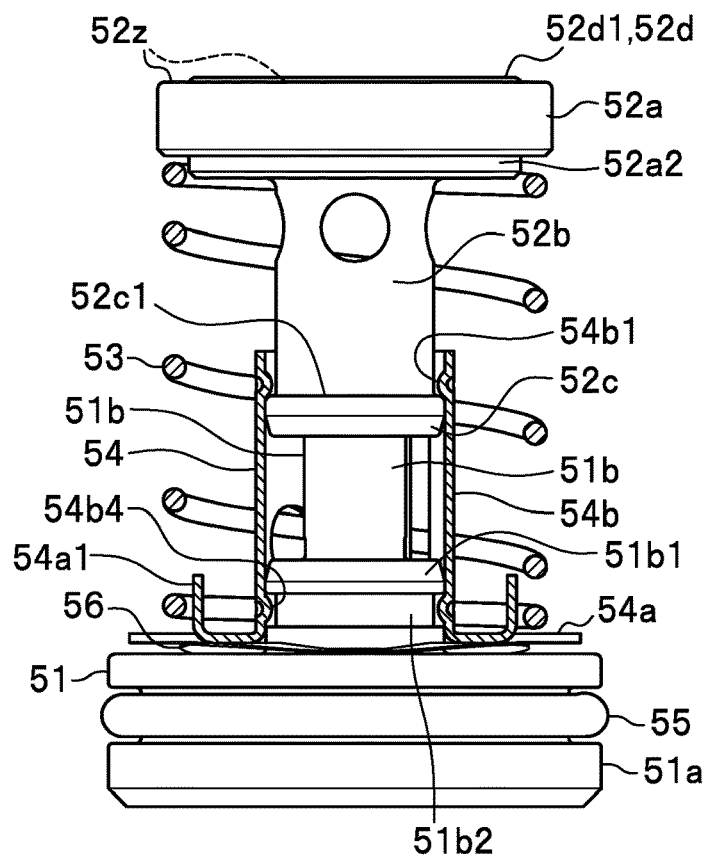
FIG. 6 is a side view of the check valve of the present embodiment, to show a retainer in cross section.

As shown in FIGS. 4, 6 and 7, the plug base 52a is formed at an edge thereof with a step 52a2 continuous in the circumferential direction. The step 52a2 has an end of the spring 53 engaged therewith. The step 52a2 works to receive the biasing force inputted by the spring 53.

As shown in FIG. 8, a lock diameter M1 of the spring 53 being locked to the step 52a2 is larger than an abut diameter M2 of the ridge portion 52d1 abutting on the seat surface 114. That is, the sealing point of the sealing member 52d with respect to the flat seat surface 114 is located radially inner than an abutting point of the spring 53 abutting on the plug base 52a.

The second extension 52b is integrally provided with the plug base 52a. As shown in FIG. 7, the second extension 52b is slidably mounted in an axial direction onto an outer surface of the first extension 51b of the cap 51. The second extension 52b is formed, on an outer peripheral surface of a front end thereof, with a flange 52c bulging in the radial direction thereof. An outer surface of the flange 52c is tapered toward a tip end of the flange 52c. Additionally, the flange 52c includes an annular surface 52c1 to face the plug base 52a.

The second extension 52b is formed with one or more circular through-holes 52b1 as a flow-through portion. The four through-holes 52b1 (three holes are shown in FIG. 7) are provided in total in a circumferential direction of the second extension 52b at predetermined intervals. The through-holes 52b1 are arranged at positions not to be closed by the first extension 51b of the cap 51 when the plug 52 is slid.

The spring 53 is interposed between the cap 51 and the plug 52 with a biasing force. The spring 53 is compressively provided between a retainer base 54a of the retainer 54 attached to the cap 51 and the step 52a2 of the plug base 52a. An outer diameter of the spring 53 is substantially the same as an outer diameter of the plug base 52a.

The retainer 54 has a substantially cylindrical shape. The retainer 54 includes the retainer base 54a in a substantially circular thin plate shape, and a cylindrical wall 54b extending from the retainer base 54a toward the plug 52.

The retainer base 54a works to receive an end of the spring 53. The retainer base 54a is integrally formed with protrusions 54a1 projecting toward the plug 52. The protrusions 54a1 are formed by making notches in the retainer base 54a and raising the notches toward the plug 52. The four protrusions 54a1 are provided in total in the circumferential direction of the retainer base 54a at predetermined intervals. The protrusions 54a1 are arranged radially inside the spring 53 so as to face the spring 53 with a slight gap, to prevent the spring 53 from being moved in the radial direction. Note that the protrusions 54a1 may be configured to abut on the spring 53 from radially inside of the spring 53.

The cylindrical wall 54b extends toward the plug 52, and is formed to a size of a front end thereof being located radially outside the flange 52c of the second extension 52b (to overlap), as shown in FIGS. 6 and 7. Here, assuming that a clearance between the outer surface of the first extension 51b of the cap 51 and the inner surface of the second extension 52b of the plug 52 is CL1, and a clearance between the outer surface of the second extension 52b and the inner surface of the cylindrical wall 54b is CL2, as shown in FIG. 7, there is a relationship of CL1 being smaller than CL2 (CL1<CL2). This relationship also holds true, when tolerance of said portions is taken into consideration, in a relationship between the maximum value (maximum allowable dimension) and the minimum value (minimum allowable dimension). That is, even when the clearance CL1 is defined with the outer surface of the first extension 51b sized to the minimum allowable dimension and the inner surface of the second extension 52b sized to the maximum allowable dimension, and the clearance CL2 is defined with the outer surface of the second extension 52b sized to the maximum allowable dimension and the inner surface of the cylindrical wall 54*b* sized to the minimum allowable dimension, the relationship of CL1 being smaller than CL2 (CL1<CL2) holds true.

The clearance CL1 allows the first extension 51*b* and the second extension 52*b* to slidably contact with each other with a sliding allowance N1 in the axial direction. The sliding allowance N1 is increased by the plug 52 being moved toward the cap 51 against the biasing force of the spring 53.

The cylindrical wall 54*b* is formed, at a front end thereof, with first protrusions 54*b*1. The first protrusions 54*b*1 are each a protrusion projecting inward in the radial direction of the cylindrical wall 54*b*, and the four first protrusions 54*b*1 are formed in total in a circumferential direction of the cylindrical wall 54*b* at equal angular intervals of 90 degrees about an axis of the retainer 54. The first protrusions 54*b*1 are positioned to axially interfere with (to axially oppose) the annular surface 52*c*1 of the flange 52*c* of the second extension 52*b*. This causes the first protrusions 54*b*1 to be locked to the annular surface 52*c*1 of the flange 52*c* of the second extension 52*b*, with the above-described clearance CL2, as shown in FIG. 7.

In addition, the cylindrical wall 54*b* is formed, at positions closer to the protrusions 54*a*1, with second protrusions 54*b*4. The second protrusions 54*b*4 are each a protrusion projecting inward in the radial direction of the cylindrical wall 54*b*, and the four second protrusions 54*b*4 are formed in total in the circumferential direction of the cylindrical wall 54*b* at equal angular intervals of 90 degrees about the axis of the retainer 54. The second protrusions 54*b*4 are engaged with the peripheral groove 51*b*2 of the base end portion 51*b*1 of the first extension 51*b*, with a predetermined amount of movement allowed in the axial direction.

Further, the cylindrical wall 54*b* is formed therein with a slit 54*b*2 extending in the axial direction. The slit 54*b*2 extends from the cylindrical wall 54*b* to the retainer base 54*a*, entirely through the cylindrical wall 54*b* and the retainer base 54*a*. The slit 54*b*2 allows the retainer 54 to be expanded and contracted in the radial direction. When the retainer 54 is assembled to the cap 51, expansion and contraction thereof due to the slit 54*b*2 is used to engage the second protrusions 54*b*4 with the peripheral groove 51*b*2 of the base end portion 51*b*1 of the first extension portion 51*b*.

Furthermore, the cylindrical wall 54*b* is formed with one or more circular through-holes 54*b*3 as a flow-through portion. In the present embodiment, the two through-holes 54*b*3*a* are provided in total at positions to face in the radial direction of the cylindrical wall 54*b*, away from those where the slit 54*b*2 is formed. Brake fluid can flow through the through-holes 54*b*3.

A waved washer 56 as an elastic member is interposed between the cap 51 and the retainer base 54*a*. As shown in FIGS. 12, 13A, 13B, 13C, the waved washer 56 has curved abutting points on surfaces thereof, to have a predetermined spring constant. The waved washer 56, when interposed between the cap 51 and the retainer base 54*a*, biases the retainer base 54*a* by a spring force toward the plug 52 (spring 53). The spring constant of the waved washer 56 is set to be larger than the spring constant of the spring 53.

A biasing force of the waved washer 56 causes the retainer base 54*a* to constantly abut on a flat stepped portion 116 formed at a boundary between the large-diameter portion 112 and the small-diameter portion 113 of the accommodation chamber 111, as shown in FIG. 14A. This allows for determining an installed length of the spring 53 with reference to the stepped portion 116. That is, the installed length of the spring 53 is determined constant, without consideration of dimensional tolerance of the cap 51, dimensional tolerance of the C ring 115, and dimensional tolerance of a fixing groove 115*a* for fixing the C ring 115. Note that the spring constant of the waved washer 56 is larger than the spring constant of the spring 53, as described above. This causes the retainer base 54*a* to suitably remain abutting on the stepped portion 116, even with a reaction force of the spring 53 acting on the retainer base 54*a* when the plug 52 has been separated from the seat surface 114, as shown in FIG. 14B.

Next, a description is given of operation of the check valve 50 during fluid aspiration control. Note that the pressure chamber 26 of the slave cylinder 20 secures an amount of brake fluid required for normal (regular) braking control, except for special braking such as sudden braking.

The fluid aspiration control causes the first shutoff valve 61 and the second shutoff valve 62 to be closed, and the second piston 22 to be driven in a depressurizing direction (return direction) to decrease pressure. Then, the pressure chamber 26 is depressurized to have negative pressure, while hydraulic pressure in the wheel cylinder W is held. This causes brake fluid to be aspirated from the reservoir tank 80 to the pressure chamber 26 through the supply path including the slave cylinder supply path 73, the branch supply path 73*a*, the check valve 50, the discharging fluid path 4*a*, and the discharge port 27. At this time, the check valve 50 has the plug base 52*a* separated from the seat surface 114 against the biasing force of the spring 53, due to negative pressure in the pressure chamber 26, as shown in FIG. 14B. This allows the brake fluid to flow into the pressure chamber 26 of the slave cylinder 20 through the check valve 50.

When the fluid aspiration control has been completed, the first shutoff valve 61 and the second shutoff valve 62 are opened to drive the second piston 22 in a pressurizing direction (direction approaching the bottom surface 21*a*). This causes brake fluid aspirated into the pressure chamber 26 to be pressurized. In accordance with completion of the fluid aspiration control, the check valve 50 has the plug base 52*a* seated on the seat surface 114 by the biasing force of the spring 53. Additionally, brake fluid aspirated into the pressure chamber 26 is pressurized to press the plug base 52*a* against the seat surface 114. This causes the branch supply path 73*a* to be blocked by the plug 52, to prevent brake fluid from flowing out of the slave cylinder 20 toward the reservoir tank 80.

The check valve 50 of the present embodiment as described above has the cap 51, the plug 52, and the spring 53 combined by the agency of the retainer 54, as a combined product. Therefore, there is no need to assemble the cap, the plug, and the spring in the base body 100, as in conventional cases. This reduces manufacturing costs and suitably prevents grit and dust from entering the assembly.

In addition, the check valve 50 being assembled as a combined product allows for reliably preventing the plug 52 and spring 53 from falling, to have no chance of the product being assembled with these failures. The check valve 50 being a combined product also facilitates part replacement of the check valve 50.

Further, the retainer 54 is locked to the plug 52, with the first protrusion 54*b*1 of the cylindrical wall 54*b* of the retainer 54 locked to the annular surface 52*c*1 of the flange 52*c* of the second extension 52*b* of the plug 52. Accordingly, the locking structure is simple to facilitate combining the check valve 50.

Still further, the protrusion 54*a*1 of the retainer base 54*a* of the retainer 54 positions an end of the spring 53 on the retainer base 54a, to have less chance of the plug 52 having an unbalanced load when slid with respect to the cap 51. Accordingly, sliding resistance is reduced and surface pressure of the spring 53 is equalized with respect to the plug 52, to improve seating performance of the plug 52.

Still further, the second protrusion 54b4 of the retainer 54 engaging with the peripheral groove 51b2 of the cap 51 allows the retainer 54 to be attached to the cap 51. Therefore, the attaching structure is simple to facilitate combining the check valve 50.

Still further, the clearance CL1 between the outer surface of the first extension 51b and the inner surface of the second extension 52b and the clearance CL2 between the outer surface of the second extension 52b and the inner surface of the cylindrical wall 54b have the relationship of CL1 being smaller than CL2 (CL1<CL2). This allows for securing a clearance of the inner surface of the cylindrical wall 54b of the retainer 54 not contacting the outer surface of the second extension 52b, when the second extension 52b is slid with respect to the first extension 51b. Accordingly, sliding resistance is reduced to improve response of opening/closing the flow path by the plug 52.

Still further, the second extension 52b and the cylindrical wall 54b are respectively formed with the through-holes 52b1 and 54b3 to allow brake fluid to flow through the through-holes 52b1 and 54b3, to prevent sliding lock due to fluid tightness.

Still further, the first extension 51b and the second extension 52b are in sliding contact with each other, with the sliding allowance N1 extending in the axial direction thereof, to implement smooth sliding between the first extension 51b and the second extension 52b. Additionally, an increase in sliding amount also increases the sliding allowance, to effect a stable stroke of the plug 52 with respect to the cap 51.

Still further, the cap 51 is fixed to the large-diameter portion 112, with the cap base 51a abutting on the stepped portion 113a formed at the boundary between the large-diameter portion 112 and the small-diameter portion 113. Accordingly, the cap 51 is prevented from being moved due to negative or positive pressure in the slave cylinder 20 connected to the discharging fluid path 4a. This prevents variation in stroke performance of the plug 52, to stabilize an installed load of the plug 52.

Still further, the waved washer 56 has a spring constant greater than that of the spring 53. This allows the cap base 51a to remain abutted on the stepped portion 113a, without being affected by expansion and contraction of the spring 53, to suitably prevent the cap 51 from being moved. Accordingly, variation in stroke performance of the plug 52 is prevented to further stabilize the installed load of the plug 52.

Still further, one end of the spring 53 is positioned on the retainer base 54a by the protrusion 54a1 of the retainer base 54a, to have less chance of the plug 52 having an unbalanced load when slid with respect to the cap 51. Accordingly, the sliding resistance is reduced and the surface pressure of the spring 53 with respect to the plug 52 is equalized, to improve seating performance of the plug 52.

Still further, the flat seating surface 52z of the plug 52 is seated on the flat seat surface 114 in the flow path and the sealing member 52d is provided on the seating surface 52z, so that what is executed is to seal a gap between two flat surfaces, to further improve sealing performance and durability. Sealing a gap between two flat surfaces also allows for increasing a diameter of the flow path while ensuring sealing performance. Accordingly, the check valve 50 can be used in a large flow path.

Still further, the sealing point of the sealing member 52d is located radially inner than the abutting point of the spring 53. This allows the plug 52 to be pressed toward the seat surface 114 over a wider area. This secures a sufficient level of the plug 52 being parallel with respect to the flat seat surface 114 in the flow path, to also improve adhesiveness of the sealing member 52d with respect to the seat surface 114. Accordingly, sealing performance of the plug 52 is improved with respect to the seat surface 114.

Still further, the sealing member 52d has the protrusion 52d1 abutted on the seat surface 114 for sealing, when hydraulic pressure of brake fluid is low. In contrast, the radially inner portion 52d3 is deformed from one side in the hydraulic path, acted on by hydraulic pressure of brake fluid, toward the other side in the hydraulic path, not acted on by hydraulic pressure of brake fluid, when hydraulic pressure of brake fluid is medium or high, to seal one from the other. This implements a two-phased sealing correlating to hydraulic pressure of brake fluid.

Still further, the ridge portion 52d1 is positioned so as to be skewed to one part of the surface, to face the seat surface 114, of the sealing member 52d, acted on by hydraulic pressure of brake fluid, with respect to the other part of the surface, not acted on by hydraulic pressure of brake fluid. This causes an area of said the other part of the surface, to face the seat surface 114, of the sealing member 52d, not acted on by hydraulic pressure of brake fluid, to become wide. Accordingly, the radially inner portion 52d3 is suitably deformed from said one part of the surface, acted on by hydraulic pressure of brake fluid, toward said the other side of the surface, not acted on by hydraulic pressure of brake fluid, when hydraulic pressure of brake fluid is medium or high. This improves sealing performance.

Still further, the brake system A of the present embodiment has the check valve 50 arranged in the supply path from the reservoir tank 80 to the slave cylinder 20 of the hydraulic pressure generator 1, to aspirate and secure brake fluid through the supply path. Additionally, the brake system A suitably prevents brake fluid pressure generated in the slave cylinder 20 from being transmitted toward the reservoir tank 80.

Hereinabove, the present invention has been described based on the embodiment, but the present invention is not limited to the configuration described in the embodiment and the configuration can be modified as required, within a range of the present invention.

In the embodiment, the first protrusion 54b1 of the cylindrical wall 54b of the retainer 54 projects from radially outside of the second extension 52b toward the second extension 52b and is locked to the annular surface 52c1, but the invention is not limited thereto. For example, the first protrusion 54b1 may be configured to project from radially inside of the second extension 52b toward an inner surface of the second extension 52b and be locked to the second extension 52b.

In addition, the ridge portion 52d1 of the sealing member 52d includes a single ridge line, but is not limited thereto and may include two or more ridge lines at predetermined intervals in the radial direction.

Figure 15:
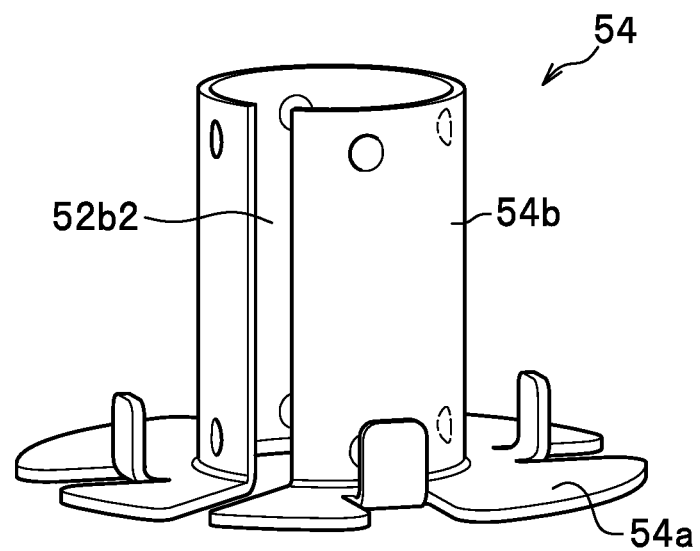
FIG. 15 is a perspective view of another form of the retainer of the check valve of the present embodiment.

Further, the cylindrical wall 54b of the retainer 54 is provided with the slit 54b2 and the through-holes 54b3, but the present invention is not limited thereto and may be provided with only the slit 54b2, as shown in FIG. 15.

Alternatively, the slit 54b2 is not an essential configuration and thus may not be provided.

Furthermore, the brake system A is provided with the check valve 50 in the supply path, but the present invention is not limited thereto and a flow path to supply brake fluid from the reservoir tank 80 to the hydraulic pressure control unit 30 may be separately provided to have the check valve 50 arranged in the flow path. Alternatively, the check valve 33 of the hydraulic pressure control unit 30 may be configured with the check valve 50. Additionally, check valves provided in the other hydraulic pressure circuits may be each configured with the check valve 50.

LEGEND FOR REFERENCE NUMERALS

1: hydraulic pressure generator, 20: slave cylinder (component unit), 50: check valve, 51: cap, 51a: cap base, 51a1: groove, 51b: first extension, 52: plug, 52a: plug base, 52b: second extension, 52b1: through-hole (flow-through portion), 52c1: annular surface (locking portion), 52d: sealing member, 53: spring, 54: retainer, 54a: retainer base (base), 54a1: protrusion, 54b: cylindrical wall, 54b1: first protrusion, 54b3: through-hole (flow-through portion), 54b4: second protrusion, 56: waved washer (elastic member), 80: reservoir tank, 111: accommodation chamber, 112: first accommodation chamber (large-diameter portion), 113: second accommodation chamber (small-diameter portion), 113a: stepped portion, 114: seat surface, CL1: clearance, CL2: clearance, and N1: sliding allowance.

The invention claimed is:

1. A check valve arranged in a flow path through which hydraulic fluid flows, the check valve comprising:
   a cap fixed in the flow path;
   a plug seated on a seat surface provided in the flow path;
   a first extension provided in the cap and extending from the cap toward the plug;
   a second extension provided in the plug, extending from the plug toward the cap, and guided by the first extension;
   a spring interposed between the cap and the plug to bias the plug toward the seat surface; and
   a retainer having a cylindrical wall and attached to the cap, extending from the cap toward the plug, and locked to the second extension,
   wherein the spring is compressively provided between the retainer and the plug, and
   the first extension, the second extension, and the cylindrical wall are provided radially inside the spring.

2. The check valve according to claim 1, wherein
   the retainer is provided with a first protrusion to be locked to the second extension, and
   the second extension is provided with a locking portion to which the first protrusion is locked.

3. The check valve according to claim 1, wherein
   the retainer is provided with a disk-shaped base that faces one end of the spring, and
   the base is formed with a protrusion to position said one end of the spring.

4. The check valve according to claim 3, wherein
   the first extension is formed with a groove, and
   the retainer is provided with a second protrusion to engage with the groove.

5. The check valve according claim 1, wherein
   the first extension has a cylindrical shape,
   the second extension has a cylindrical shape to be slidably mounted onto an outer surface of the first extension,
   the retainer has a cylindrical wall to be arranged on a radially outer side of the second extension, and
   assuming that a clearance between the outer surface of the first extension and an inner surface of the second extension is CL1, and a clearance between an outer surface of the second extension and an inner surface of the cylindrical wall is CL2, there is a relationship of CL1 being smaller than CL2 (CL1<CL2).

6. The check valve according to claim 5, wherein
   the second extension and the cylindrical wall are each formed with a flow-through portion to allow hydraulic fluid to flow therethrough.

7. The check valve according to claim 1, wherein
   the first extension and the second extension are in sliding contact with each other, with a sliding allowance extending in an axial direction thereof.

8. The check valve according to claim 1, wherein
   the check valve is arranged in an accommodation chamber having a first accommodation chamber and a second accommodation chamber connected to the first accommodation chamber,
   the cap is fixed to the first accommodation chamber,
   the seat surface is provided in the second accommodation chamber,
   the retainer includes a disk-shaped base to receive one end of the spring,
   an elastic member is arranged between the cap and the base of the retainer, and
   the base of the retainer abuts on a stepped portion formed at a boundary between the first accommodation chamber and the second accommodation chamber, due to a biasing force of the elastic member.

9. The check valve according to claim 8, wherein
   the elastic member has a spring constant greater than that of the spring.

10. The check valve according to claim 8, wherein
    the base of the retainer is formed with a protrusion to position one end of the spring.

11. The check valve according to claim 1, wherein
    the seat surface is flat,
    the plug has a flat seating surface to face the seat surface, and
    the seating surface is provided with a sealing member to abut on the seat surface.

12. The check valve according to claim 11, wherein
    a sealing point of the sealing member with respect to the seat surface is located radially inward of an abutting point of the spring abutting on the plug.

13. The check valve according to claim 11, wherein
    the sealing member includes a base portion, a ridge portion protruding from the base portion toward the seat surface, and a deformable portion continuous to the ridge portion, and abuts on the seat surface to seal one side in the flow path, acted on by hydraulic pressure of hydraulic fluid, from the other side in the flow path, not acted on by hydraulic pressure of hydraulic fluid, and
    the deformable portion is deformable from said one side, acted on by hydraulic pressure of hydraulic fluid, toward said the other side not acted on by hydraulic pressure of hydraulic fluid.

14. The check valve according to claim 13, wherein
    the ridge portion is positioned so as to be skewed to one part of a surface, to face the seat surface, of the sealing member, acted on by hydraulic pressure of hydraulic fluid, with respect to the other part of the surface, not acted on by hydraulic pressure of hydraulic fluid.

15. A brake system including the check valve according to claim 1, the system comprising:
a reservoir tank configured to store hydraulic fluid; and
a hydraulic pressure generator configured to generate hydraulic pressure to act on a wheel brake,
wherein the check valve is arranged in a flow path from the reservoir tank to a component unit of the hydraulic pressure generator.

16. A check valve arranged in a flow path through which hydraulic fluid flows, the check valve comprising:
a cap fixed in the flow path;
a plug seated on a seat surface provided in the flow path;
a first extension provided in the cap and extending from the cap toward the plug;
a second extension provided in the plug, extending from the plug toward the cap, and guided by the first extension;
a spring interposed between the cap and the plug to bias the plug toward the seat surface; and
a retainer attached to the cap, extending from the cap toward the plug, and locked to the second extension,
wherein the retainer is provided with a disk-shaped base to face one end of the spring, and the base is formed with a protrusion to position said one end of the spring.

17. A check valve arranged in a flow path through which hydraulic fluid flows, the check valve comprising:
a cap fixed in the flow path;
a plug seated on a seat surface provided in the flow path;
a first extension provided in the cap and extending from the cap toward the plug;
a second extension provided in the plug, extending from the plug toward the cap, and guided by the first extension;
a spring interposed between the cap and the plug to bias the plug toward the seat surface; and
a retainer attached to the cap, extending from the cap toward the plug, and locked to the second extension,
wherein the first extension has a cylindrical shape,
the second extension has a cylindrical shape to be slidably mounted onto an outer surface of the first extension,
the retainer has a cylindrical wall to be arranged on a radially outer side of the second extension, and
assuming that a clearance between the outer surface of the first extension and an inner surface of the second extension is CL1, and a clearance between an outer surface of the second extension and an inner surface of the cylindrical wall is CL2, there is a relationship of CL1 being smaller than CL2 (CL1<CL2).

18. A check valve arranged in a flow path through which hydraulic fluid flows, the check valve comprising:
a cap fixed in the flow path;
a plug seated on a seat surface provided in the flow path;
a first extension provided in the cap and extending from the cap toward the plug;
a second extension provided in the plug, extending from the plug toward the cap, and guided by the first extension;
a spring interposed between the cap and the plug to bias the plug toward the seat surface; and
a retainer attached to the cap, extending from the cap toward the plug, and locked to the second extension,
wherein the check valve is arranged in an accommodation chamber having a first accommodation chamber and a second accommodation chamber connected to the first accommodation chamber,
the cap is fixed to the first accommodation chamber,
the seat surface is provided in the second accommodation chamber,
the retainer includes a disk-shaped base to receive one end of the spring,
an elastic member is arranged between the cap and the base of the retainer, and
the base of the retainer abuts on a stepped portion formed at a boundary between the first accommodation chamber and the second accommodation chamber, due to a biasing force of the elastic member.

19. A check valve arranged in a flow path through which hydraulic fluid flows, the check valve comprising:
a cap fixed in the flow path;
a plug seated on a seat surface provided in the flow path;
a first extension provided in the cap and extending from the cap toward the plug;
a second extension provided in the plug, extending from the plug toward the cap, and guided by the first extension;
a spring interposed between the cap and the plug to bias the plug toward the seat surface; and
a retainer attached to the cap, extending from the cap toward the plug, and locked to the second extension,
wherein the sealing member includes a base portion, a ridge portion protruding from the base portion toward the seat surface, and a deformable portion continuous to the ridge portion, and abuts on the seat surface to seal one side in the flow path, acted on by hydraulic pressure of hydraulic fluid, from the other side in the flow path, not acted on by hydraulic pressure of hydraulic fluid, and
the deformable portion is deformable from said one side, acted on by hydraulic pressure of hydraulic fluid, toward said the other side not acted on by hydraulic pressure of hydraulic fluid.

* * * * *